United States Patent
Loheide et al.

(10) Patent No.: US 11,778,272 B2
(45) Date of Patent: *Oct. 3, 2023

(54) DELIVERY OF DIFFERENT SERVICES THROUGH DIFFERENT CLIENT DEVICES

(71) Applicant: Turner Broadcasting System, Inc., Atlanta, GA (US)

(72) Inventors: Donald Jude Loheide, Mableton, GA (US); Matthew Paul Giles, Marietta, GA (US); Gregory McClain Stigall, Douglasville, GA (US); Nishith Kumar Sinha, Mableton, GA (US); Cindy Loren Campbell, Atlanta, GA (US); James J Arnzen, Atlanta, GA (US); Nicolas Paul Webb, McDonough, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/453,628

(22) Filed: Nov. 4, 2021

(65) Prior Publication Data

US 2022/0060787 A1 Feb. 24, 2022

Related U.S. Application Data

(63) Continuation of application No. 15/988,308, filed on May 24, 2018, now Pat. No. 11,297,386.
(Continued)

(51) Int. Cl.
*H04N 21/458* (2011.01)
*H04L 67/306* (2022.01)
(Continued)

(52) U.S. Cl.
CPC ....... *H04N 21/458* (2013.01); *G06Q 30/0242* (2013.01); *G06Q 30/0251* (2013.01);
(Continued)

(58) Field of Classification Search
CPC ......... H04N 21/8358; H04N 21/23892; H04N 21/42203; H04N 21/25891
See application file for complete search history.

(56) References Cited

U.S. PATENT DOCUMENTS 6,701,355 B1 3/2004 Brandt et al.
8,099,757 B2 1/2012 Riedl et al.
(Continued)

FOREIGN PATENT DOCUMENTS

KR 101061952 B1 9/2011

OTHER PUBLICATIONS

Corrected Notice of Allowance for U.S. Appl. No. 15/396,468 dated Apr. 1, 2022.
(Continued)

*Primary Examiner* — Mushfikh I Alam
(74) *Attorney, Agent, or Firm* — CHIP LAW GROUP

(57) ABSTRACT

A system that handles delivery of a service through a client device or a secondary device paired with the client device, includes an interactive service provider and the client device. The interactive service provider inserts at least one of digital watermarks, fingerprints, and trigger identifiers at event opportunities in media content. The client device detects at least one of the inserted digital watermarks, the digital fingerprints, and the inserted trigger identifiers in the media content. The client device further renders overlay graphics on the media content and activates at least one of input devices in vicinity of the client device or the rendered overlay graphics. The client device receives trigger responses over an activated overlay graphic, via the acti-
(Continued)

vated input devices. The client device further displays an interactive view on the client device, to enable delivery of services in response to the received trigger responses.

20 Claims, 13 Drawing Sheets

Related U.S. Application Data

(60) Provisional application No. 62/511,190, filed on May 25, 2017.

(51) Int. Cl.

| | | |
|---|---|---|
| H04N 21/431 | (2011.01) | |
| H04N 21/81 | (2011.01) | |
| G06Q 30/0242 | (2023.01) | |
| G06Q 30/0273 | (2023.01) | |
| H04N 21/478 | (2011.01) | |
| H04L 67/125 | (2022.01) | |
| H04L 67/1097 | (2022.01) | |
| H04L 65/612 | (2022.01) | |
| H04L 67/01 | (2022.01) | |
| H04L 67/51 | (2022.01) | |
| H04L 67/60 | (2022.01) | |
| H04N 21/233 | (2011.01) | |
| H04N 21/234 | (2011.01) | |
| H04N 21/2387 | (2011.01) | |
| H04N 21/2389 | (2011.01) | |
| H04N 21/8545 | (2011.01) | |
| G06Q 30/0601 | (2023.01) | |
| H04N 21/2543 | (2011.01) | |
| H04N 21/44 | (2011.01) | |
| H04N 21/845 | (2011.01) | |
| H04N 21/235 | (2011.01) | |
| H04N 21/258 | (2011.01) | |
| H04N 21/435 | (2011.01) | |
| H04N 21/6332 | (2011.01) | |
| G06Q 30/0251 | (2023.01) | |
| H04L 65/60 | (2022.01) | |
| H04N 21/266 | (2011.01) | |
| H04N 21/84 | (2011.01) | |
| H04N 21/239 | (2011.01) | |
| H04N 21/262 | (2011.01) | |
| H04N 21/2668 | (2011.01) | |
| H04N 21/6587 | (2011.01) | |
| H04L 9/32 | (2006.01) | |
| H04N 21/24 | (2011.01) | |
| H04N 21/472 | (2011.01) | |
| H04N 21/835 | (2011.01) | |
| H04H 20/10 | (2008.01) | |
| H04N 21/8358 | (2011.01) | |

(52) U.S. Cl.
CPC ..... *G06Q 30/0275* (2013.01); *G06Q 30/0633* (2013.01); *H04L 9/32* (2013.01); *H04L 65/60* (2013.01); *H04L 65/612* (2022.05); *H04L 67/01* (2022.05); *H04L 67/1097* (2013.01); *H04L 67/125* (2013.01); *H04L 67/306* (2013.01); *H04L 67/51* (2022.05); *H04L 67/60* (2022.05); *H04N 21/233* (2013.01); *H04N 21/2353* (2013.01); *H04N 21/2387* (2013.01); *H04N 21/2393* (2013.01); *H04N 21/23418* (2013.01); *H04N 21/23424* (2013.01); *H04N 21/23892* (2013.01); *H04N 21/24* (2013.01); *H04N 21/2543* (2013.01); *H04N 21/25883* (2013.01); *H04N 21/25891* (2013.01); *H04N 21/266* (2013.01); *H04N 21/2668* (2013.01); *H04N 21/26208* (2013.01); *H04N 21/26241* (2013.01); *H04N 21/435* (2013.01); *H04N 21/4312* (2013.01); *H04N 21/4316* (2013.01); *H04N 21/44008* (2013.01); *H04N 21/44016* (2013.01); *H04N 21/47217* (2013.01); *H04N 21/47815* (2013.01); *H04N 21/6332* (2013.01); *H04N 21/6587* (2013.01); *H04N 21/812* (2013.01); *H04N 21/835* (2013.01); *H04N 21/84* (2013.01); *H04N 21/845* (2013.01); *H04N 21/8545* (2013.01); *G06Q 2220/00* (2013.01); *H04H 20/10* (2013.01); *H04N 21/8358* (2013.01)

(56) References Cited

U.S. PATENT DOCUMENTS

| | | |
|---|---|---|
| 8,132,203 B2 | 3/2012 | Heer |
| 8,458,053 B1 | 6/2013 | Buron et al. |
| 8,600,382 B2 | 12/2013 | Hicks, III |
| 8,819,726 B2 | 8/2014 | Wetzer et al. |
| 8,842,879 B2 | 9/2014 | Laksono et al. |
| 8,954,521 B1 | 2/2015 | Faaborg et al. |
| 9,380,264 B1 | 6/2016 | Vakalapudi |
| 10,045,091 B1 | 8/2018 | Nijim et al. |
| 10,924,804 B2 | 2/2021 | Loheide et al. |
| 10,939,169 B2 | 3/2021 | Loheide et al. |
| 11,109,102 B2 | 8/2021 | Loheide et al. |
| 2002/0112239 A1 | 8/2002 | Goldman |
| 2003/0151538 A1 | 8/2003 | Escobosa et al. |
| 2004/0031056 A1 | 2/2004 | Wolff |
| 2004/0163103 A1 | 8/2004 | Swix et al. |
| 2004/0172662 A1 | 9/2004 | Danker et al. |
| 2005/0015816 A1 | 1/2005 | Christofalo et al. |
| 2005/0060745 A1 | 3/2005 | Riedl et al. |
| 2005/0096978 A1 | 5/2005 | Black |
| 2006/0064730 A1 | 3/2006 | Rael et al. |
| 2006/0122916 A1* | 6/2006 | Kassan ............... G06Q 30/06 705/26.8 |
| 2006/0287915 A1 | 12/2006 | Boulet et al. |
| 2007/0101361 A1 | 5/2007 | Spielman et al. |
| 2007/0250901 A1 | 10/2007 | McIntire et al. |
| 2009/0070808 A1 | 3/2009 | Jacobs |
| 2009/0187939 A1 | 7/2009 | LaJoie |
| 2009/0256972 A1 | 10/2009 | Ramaswamy et al. |
| 2009/0285217 A1 | 11/2009 | Frink et al. |
| 2009/0287790 A1 | 11/2009 | Upton et al. |
| 2010/0010899 A1 | 1/2010 | Lambert et al. |
| 2010/0125880 A1 | 5/2010 | Roewe |
| 2010/0287297 A1 | 11/2010 | Lefebvre |
| 2010/0293585 A1 | 11/2010 | Xia |
| 2011/0052144 A1 | 3/2011 | Abbas et al. |
| 2011/0123062 A1 | 5/2011 | Hilu |
| 2011/0177775 A1 | 7/2011 | Gupta et al. |
| 2011/0209181 A1 | 8/2011 | Gupta et al. |
| 2011/0238754 A1 | 9/2011 | Dasilva et al. |
| 2011/0246202 A1 | 10/2011 | McMillan et al. |
| 2011/0302601 A1 | 12/2011 | Mayo et al. |
| 2012/0030011 A1 | 2/2012 | Rey et al. |
| 2012/0271942 A1 | 10/2012 | Walker et al. |
| 2012/0272278 A1 | 10/2012 | Bedi |
| 2012/0304223 A1 | 11/2012 | Sargent et al. |
| 2013/0085851 A1 | 4/2013 | Pedro et al. |
| 2013/0205212 A1* | 8/2013 | Sinha ............... H04N 21/432 715/719 |
| 2013/0263182 A1 | 10/2013 | Ivy et al. |
| 2013/0276023 A1 | 10/2013 | Kent et al. |
| 2014/0013354 A1 | 1/2014 | Johnson et al. |
| 2014/0020017 A1 | 1/2014 | Stern et al. |
| 2014/0071818 A1 | 3/2014 | Wang et al. |
| 2014/0152894 A1 | 6/2014 | Childs et al. |
| 2014/0186001 A1 | 7/2014 | Aldrey et al. |
| 2014/0189514 A1* | 7/2014 | Hilliard ............... G06Q 30/06 715/719 |
| 2014/0270338 A1 | 9/2014 | Zhao et al. |

(56) References Cited

U.S. PATENT DOCUMENTS

| | | | |
|---|---|---|---|
| 2015/0074732 A1 | 3/2015 | Green et al. | |
| 2015/0106856 A1 | 4/2015 | Rankine | |
| 2015/0237386 A1 | 8/2015 | Sheehan et al. | |
| 2015/0256861 A1 | 9/2015 | Oyman | |
| 2015/0271234 A1 | 9/2015 | O'Malley et al. | |
| 2015/0289022 A1 | 10/2015 | Gross | |
| 2015/0381936 A1 | 12/2015 | Goyal et al. | |
| 2015/0382042 A1 | 12/2015 | Wagenaar et al. | |
| 2016/0077710 A1 | 3/2016 | Lewis et al. | |
| 2016/0105477 A1 | 4/2016 | Holden et al. | |
| 2016/0127788 A1* | 5/2016 | Roberts | H04N 21/4826 725/37 |
| 2016/0142783 A1 | 5/2016 | Bagga et al. | |
| 2016/0165306 A1 | 6/2016 | Nam | |
| 2016/0182954 A1 | 6/2016 | Nguyen et al. | |
| 2016/0308958 A1 | 10/2016 | Navali et al. | |
| 2016/0316247 A1 | 10/2016 | Biagini et al. | |
| 2016/0345074 A1 | 11/2016 | Serbest et al. | |
| 2017/0055012 A1 | 2/2017 | Phillips et al. | |
| 2017/0055041 A1 | 2/2017 | Zhu | |
| 2017/0070789 A1 | 3/2017 | Liassides et al. | |
| 2017/0099506 A1 | 4/2017 | Grover | |
| 2017/0099511 A1* | 4/2017 | Grover | H04N 21/2668 |
| 2017/0118537 A1 | 4/2017 | Stransky-Heilkron et al. | |
| 2017/0118538 A1* | 4/2017 | Ashbacher | H04N 21/262 |
| 2017/0164019 A1 | 6/2017 | Oh et al. | |
| 2017/0195718 A1 | 7/2017 | Nair et al. | |
| 2017/0257446 A1 | 9/2017 | Bevilacqua et al. | |
| 2017/0289597 A1 | 10/2017 | Riedel et al. | |
| 2018/0007060 A1* | 1/2018 | Leblang | H04L 63/107 |
| 2018/0165650 A1 | 6/2018 | Kashyape et al. | |
| 2018/0184047 A1 | 6/2018 | Simonsen et al. | |
| 2018/0285747 A1 | 10/2018 | Bron et al. | |
| 2018/0367823 A1 | 12/2018 | Brinkley et al. | |
| 2019/0068665 A1 | 2/2019 | Kieft et al. | |
| 2019/0364317 A1 | 11/2019 | Milford | |
| 2019/0380021 A1 | 12/2019 | Meek et al. | |
| 2020/0059308 A1 | 2/2020 | Cox et al. | |
| 2020/0244778 A1 | 7/2020 | Berookhim et al. | |
| 2021/0297740 A1 | 9/2021 | Loheide et al. | |

OTHER PUBLICATIONS

Corrected Notice of Allowance for U.S. Appl. No. 15/988,308 dated Mar. 2, 2022.
Corrected Notice of Allowance for U.S. Appl. No. 16/985,444 dated Apr. 20, 2022.
Corrected Notice of Allowance for U.S. Appl. No. 16/985,444 dated Mar. 25, 2022.
Corrected Notice of Allowance for U.S. Appl. No. 17/017,145 dated Mar. 4, 2022.
Corrected Notice of Allowance for U.S. Appl. No. 17/038,323 dated Apr. 19, 2022.
Corrected Notice of Allowance for U.S. Appl. No. 17/094,102 dated Apr. 20, 2022.
Corrected Notice of Allowance for U.S. Appl. No. 17/094,102 dated Mar. 10, 2022.
Corrected Notice of Allowance for U.S. Appl. No. 17/326,258 dated Apr. 19, 2022.
Corrected Notice of Allowance for U.S. Appl. No. 17/326,258 dated Feb. 25, 2022.
Corrected Notice of Allowance for U.S. Appl. No. 17/326,258 dated Mar. 14, 2022.
Corrected Notice of Allowance for U.S. Appl. No. 17/326,258 dated Mar. 2, 2022.
Final Office Action for U.S. Appl. No. 15/988,572 dated Mar. 10, 2022.
Final Office Action for U.S. Appl. No. 17/017,241 dated Apr. 28, 2022.
Non-Final Office Action for U.S. Appl. No. 16/854,970 dated Feb. 17, 2022.
Non-Final Office Action for U.S. Appl. No. 16/918,085 dated Mar. 31, 2022.
Notice of Allowance for U.S. Appl. No. 15/396,468 dated Mar. 18, 2022.
Notice of Allowance for U.S. Appl. No. 16/895,439 dated Mar. 1, 2022.
Notice of Allowance for U.S. Appl. No. 16/902,893 dated Feb. 25, 2022.
Notice of Allowance for U.S. Appl. No. 17/016,789 dated Feb. 11, 2022.
Notice of Allowance for U.S. Appl. No. 17/017,052 dated Feb. 11, 2022.
Notice of Allowance for U.S. Appl. No. 17/017,145 dated Feb. 16, 2022.
Notice of Allowance for U.S. Appl. No. 17/094,319 dated Apr. 12, 2022.
Notice of Allowance for U.S. Appl. No. 17/147,887 dated Apr. 19, 2022.
Notice of Allowance for U.S. Appl. No. 17/326,258 dated Apr. 27, 2022.
Notice of Allowance for U.S. Appl. No. 17/340,166 dated Mar. 21, 2022.
Corrected Notice of Allowance for U.S. Appl. No. 15/396,468 dated Jun. 24, 2022.
Corrected Notice of Allowance for U.S. Appl. No. 16/985,444 dated Jun. 1, 2022.
Corrected Notice of Allowance for U.S. Appl. No. 17/016,789 dated Jun. 27, 2022.
Corrected Notice of Allowance for U.S. Appl. No. 17/016,789 dated May 18, 2022.
Corrected Notice of Allowance for U.S. Appl. No. 17/017,052 dated Aug. 1, 2022.
Corrected Notice of Allowance for U.S. Appl. No. 17/017,052 dated Jun. 15, 2022.
Corrected Notice of Allowance for U.S. Appl. No. 17/017,145 dated Jul. 22, 2022.
Corrected Notice of Allowance for U.S. Appl. No. 17/017,145 dated Jun. 2, 2022.
Corrected Notice of Allowance for U.S. Appl. No. 17/017,145 dated May 17, 2022.
Corrected Notice of Allowance for U.S. Appl. No. 17/017,241 dated Aug. 3, 2022.
Corrected Notice of Allowance for U.S. Appl. No. 17/038,323 dated May 26, 2022.
Corrected Notice of Allowance for U.S. Appl. No. 17/094,102 dated Aug. 3, 2022.
Corrected Notice of Allowance for U.S. Appl. No. 17/094,102 dated Jun. 24, 2022.
Corrected Notice of Allowance for U.S. Appl. No. 17/094,102 dated May 17, 2022.
Corrected Notice of Allowance for U.S. Appl. No. 17/094,319 dated Aug. 1, 2022.
Corrected Notice of Allowance for U.S. Appl. No. 17/094,319 dated Jun. 15, 2022.
Corrected Notice of Allowance for U.S. Appl. No. 17/094,319 dated May 17, 2022.
Corrected Notice of Allowance for U.S. Appl. No. 17/147,887 dated Jul. 22, 2022.
Corrected Notice of Allowance for U.S. Appl. No. 17/147,887 dated May 18, 2022.
Corrected Notice of Allowance for U.S. Appl. No. 17/340,166 dated Jul. 5, 2022.
Corrected Notice of Allowance for U.S. Appl. No. 17/340,166 dated Jun. 2, 2022.
Non-Final Office Action for U.S. Appl. No. 17/206,473 dated Jun. 22, 2022.
Non-Final Office Action for U.S. Appl. No. 17/206,737 dated Jun. 23, 2022.
Non-Final Office Action for U.S. Appl. No. 17/527,817 dated Jun. 15, 2022.
Notice of Allowability for U.S. Appl. No. 16/092,893 dated Jun. 8, 2022.

(56) References Cited

OTHER PUBLICATIONS

Notice of Allowability for U.S. Appl. No. 16/895,439 dated Jul. 20, 2022.
Notice of Allowability for U.S. Appl. No. 16/895,439 dated Jun. 8, 2022.
Notice of Allowability for U.S. Appl. No. 16/895,439 dated May 16, 2022.
Notice of Allowability for U.S. Appl. No. 16/902,893 dated Jul. 20, 2022.
Notice of Allowability for U.S. Appl. No. 16/902,893 dated May 13, 2022.
Notice of Allowance for U.S. Appl. No. 17/017,241 dated Jul. 15, 2022.
Notice of Allowance for U.S. Appl. No. 17/340,677 dated Aug. 8, 2022.
Corrected Notice of Allowance for U.S. Appl. No. 15/986,451 dated Jan. 5, 2022.
Corrected Notice of Allowance for U.S. Appl. No. 15/986,451 dated Nov. 16, 2021.
Corrected Notice of Allowance for U.S. Appl. No. 15/988,308 dated Dec. 22, 2021.
Corrected Notice of Allowance for U.S. Appl. No. 15/988,308 dated Jan. 24, 2022.
Corrected Notice of Allowance for U.S. Appl. No. 15/988,492 dated Dec. 3, 2021.
Corrected Notice of Allowance for U.S. Appl. No. 17/038,323 dated Feb. 2, 2022.
Corrected Notice of Allowance for U.S. Appl. No. 17/326,258 dated Dec. 22, 2021.
Final Office Action for U.S. Appl. No. 15/396,468 dated Dec. 2, 2021.
Final Office Action for U.S. Appl. No. 16/918,085 dated Dec. 8, 2021.
Non-Final Office Action for U.S. Appl. No. 17/017,052 dated Dec. 27, 2021.
Non-Final Office Action for U.S. Appl. No. 17/017,145 dated Dec. 22, 2021.
Non-Final Office Action for U.S. Appl. No. 17/017,241 dated Dec. 20, 2021.
Non-Final Office Action for U.S. Appl. No. 17/094,319 dated Dec. 8, 2021.
Non-Final Office Action for U.S. Appl. No. 17/147,887 dated Dec. 22, 2021.
Non-Final Office Acton for U.S. Appl. No. 17/016,789 dated Dec. 21, 2021.
Notice of Allowance for U.S. Appl. No. 16/985,444 dated Jan. 10, 2022.
Notice of Allowance for U.S. Appl. No. 17/038,323 dated Jan. 12, 2022.
Notice of Allowance for U.S. Appl. No. 17/094,102 dated Jan. 14, 2022.
Notice of Allowance for U.S. Appl. No. 17/326,258 dated Nov. 17, 2021.
Supplemental Notice of Allowance for U.S. Appl. No. 15/988,492 dated Nov. 9, 2021.
Corrected Notice of Allowance for U.S. Appl. No. 15/396,468 dated Aug. 26, 2022.
Corrected Notice of Allowance for U.S. Appl. No. 15/396,468 dated Oct. 17, 2022.
Corrected Notice of Allowance for U.S. Appl. No. 16/895,439 dated Sep. 14, 2022.
Corrected Notice of Allowance for U.S. Appl. No. 16/902,893 dated Sep. 19, 2022.
Corrected Notice of Allowance for U.S. Appl. No. 17/017,145 dated Sep. 15, 2022.
Corrected Notice of Allowance for U.S. Appl. No. 17/017,241 dated Oct. 20, 2022.
Corrected Notice of Allowance for U.S. Appl. No. 17/094,319 dated Sep. 23, 2022.
Corrected Notice of Allowance for U.S. Appl. No. 17/147,887 dated Oct. 11, 2022.
Corrected Notice of Allowance for U.S. Appl. No. 17/340,166 dated Aug. 22, 2022.
Corrected Notice of Allowance for U.S. Appl. No. 17/340,166 dated Sep. 23, 2022.
Corrected Notice of Allowance for U.S. Appl. No. 17/340,677 dated Nov. 14, 2022.
Corrected Notice of Allowance for U.S. Appl. No. 17/340,677 dated Oct. 21, 2022.
Final Office Action for U.S. Appl. No. 16/854,970 dated Aug. 18, 2022.
Final Office Action for U.S. Appl. No. 16/918,085 dated Oct. 24, 2022.
Final Office Action for U.S. Appl. No. 17/206,473 dated Sep. 8, 2022.
Non-Final Office Action for U.S. Appl. No. 17/326,281 dated Aug. 18, 2022.
Non-Final Office Action for U.S. Appl. No. 15/988,572 dated Oct. 6, 2022.
Non-Final Office Action for U.S. Appl. No. 17/016,789 dated Sep. 22, 2022.
Non-Final Office Action for U.S. Appl. No. 17/340,538 dated Oct. 3, 2022.
Non-Final Office Action for U.S. Appl. No. 17/408,680 dated Sep. 15, 2022.
Notice of Allowance for U.S. Appl. No. 16/854,970 dated Oct. 13, 2022.
Notice of Allowance for U.S. Appl. No. 17/306,758 dated Sep. 16, 2022.
Notice of Allowance for U.S. Appl. No. 17/527,817 dated Oct. 3, 2022.
Notice of Allowance for U.S. Appl. No. 17/688,666 dated Sep. 20, 2022.
Notice of Allowance for U.S. Appl. No. 17/839,649 dated Oct. 19, 2022.
Notice of Allowance for U.S. Appl. No. 17/839,882 dated Oct. 26, 2022.
Notice of Allowance for U.S. Appl. No. 17/858,698 dated Oct. 4, 2022.
Corrected Notice of Allowance for U.S. Appl. No. 16/854,970 dated Jan. 23, 2023.
Corrected Notice of Allowance for U.S. Appl. No. 16/854,970 dated Jan. 5, 2023.
Corrected Notice of Allowance for U.S. Appl. No. 17/017,241 dated Dec. 2, 2022.
Corrected Notice of Allowance for U.S. Appl. No. 17/306,758 dated Dec. 21, 2022.
Corrected Notice of Allowance for U.S. Appl. No. 17/306,758 dated Feb. 15, 2023.
Corrected Notice of Allowance for U.S. Appl. No. 17/306,758 dated Jan. 5, 2023.
Corrected Notice of Allowance for U.S. Appl. No. 17/326,281 dated Dec. 22, 2022.
Corrected Notice of Allowance for U.S. Appl. No. 17/340,256 dated Feb. 13, 2023.
Corrected Notice of Allowance for U.S. Appl. No. 17/340,256 dated Jan. 6, 2023.
Corrected Notice of Allowance for U.S. Appl. No. 17/340,538 dated Feb. 15, 2023.
Corrected Notice of Allowance for U.S. Appl. No. 17/340,677 dated Dec. 9, 2022.
Corrected Notice of Allowance for U.S. Appl. No. 17/688,666 dated Dec. 14, 2022.
Corrected Notice of Allowance for U.S. Appl. No. 17/688,666 dated Dec. 28, 2022.
Corrected Notice of Allowance for U.S. Appl. No. 17/688,666 dated Feb. 10, 2023.
Corrected Notice of Allowance for U.S. Appl. No. 17/839,882 dated Dec. 23, 2022.
Corrected Notice of Allowance for U.S. Appl. No. 17/858,698 dated Dec. 28, 2022.

(56) References Cited

OTHER PUBLICATIONS

Corrected Notice of Allowance for U.S. Appl. No. 17/858,698 dated Jan. 12, 2023.
Final Office Action for U.S. Appl. No. 17/206,737 dated Jan. 5, 2023.
Final Office Action for U.S. Appl. No. 17/408,680 dated Jan. 12, 2023.
Final Office Action for U.S. Appl. No. 17/408,739 dated Jan. 12, 2023.
Non-Final Office Action for U.S. Appl. No. 17/206,473 dated Dec. 22, 2022.
Non-Final Office Action for U.S. Appl. No. 17/366,738 dated Dec. 9, 2022.
Non-Final Office Action for U.S. Appl. No. 17/708,241 dated Dec. 20, 2022.
Non-Final Office Action for U.S. Appl. No. 17/830,587 dated Nov. 25, 2022.
Notice of Allowability for U.S. Appl. No. 17/839,649 dated Jan. 25, 2023.
Notice of Allowance for U.S. Appl. No. 16/918,085 dated Jan. 13, 2023.
Notice of Allowance for U.S. Appl. No. 17/326,281 dated Dec. 7, 2022.
Notice of Allowance for U.S. Appl. No. 17/340,538 dated Jan. 23, 2023.
Notice of Allowance for U.S. Appl. No. 17/830,788 dated Dec. 9, 2022.
Supplemental Notice of Allowance for U.S. Appl. No. 17/527,817 dated Jan. 5, 2023.
Advisory Action for U.S. Appl. No. 17/408,680 dated Mar. 28, 2023.
Advisory Action for U.S. Appl. No. 17/408,739 dated Mar. 28, 2023.
Final Office Action for U.S. Appl. No. 15/988,572 dated Apr. 11, 2023.
Non-Final Office Action for U.S. Appl. No. 17/739,885 dated Mar. 30, 2023.
Non-Final Office Action for U.S. Appl. No. 17/742,468 dated Mar. 30, 2023.
Non-Final Office Action for U.S. Appl. No. 18/149,332 dated Apr. 27, 2023.
Notice of Allowance for U.S. Appl. No. 17/708,241 dated Apr. 5, 2023.
Notice of Allowance for U.S. Appl. No. 17/731,049 dated Mar. 2, 2023.
Notice of Allowance for U.S. Appl. No. 17/206,473 dated Mar. 30, 2023.
Notice of Allowance for U.S. Appl. No. 17/830,587 dated Mar. 9, 2023.
Notice of Allowance for U.S. Appl. No. 17/986,403 dated Apr. 7, 2023.
Notice of Allowance for U.S. Appl. No. 18/158,202 dated May 25, 2023.
Non-Final Office Action for U.S. Appl. No. 17/206,737 dated Jun. 8, 2023.
Non-Final Office Action for U.S. Appl. No. 17/734,704 dated Jun. 21, 2023.
Notice of Allowance for U.S. Appl. No. 17/408,739 dated Jul. 5, 2023.
Notice of Allowance for U.S. Appl. No. 18/160,833 dated Jun. 14, 2023.
Final Office Action for U.S. Appl. No. 17/366,738 dated Jul. 20, 2023.
Non-Final Office Action for U.S. Appl. No. 18/153,636 dated Jul. 19, 2023.
Notice of Allowance for U.S. Appl. No. 17/408,680 dated Jul. 20, 2023.
Notice of Allowance for U.S. Appl. No. 18/157,294 dated Jul. 11, 2023.
Notice of Allowance for U.S. Appl. No. 18/161,957 dated Jul. 11, 2023.

* cited by examiner

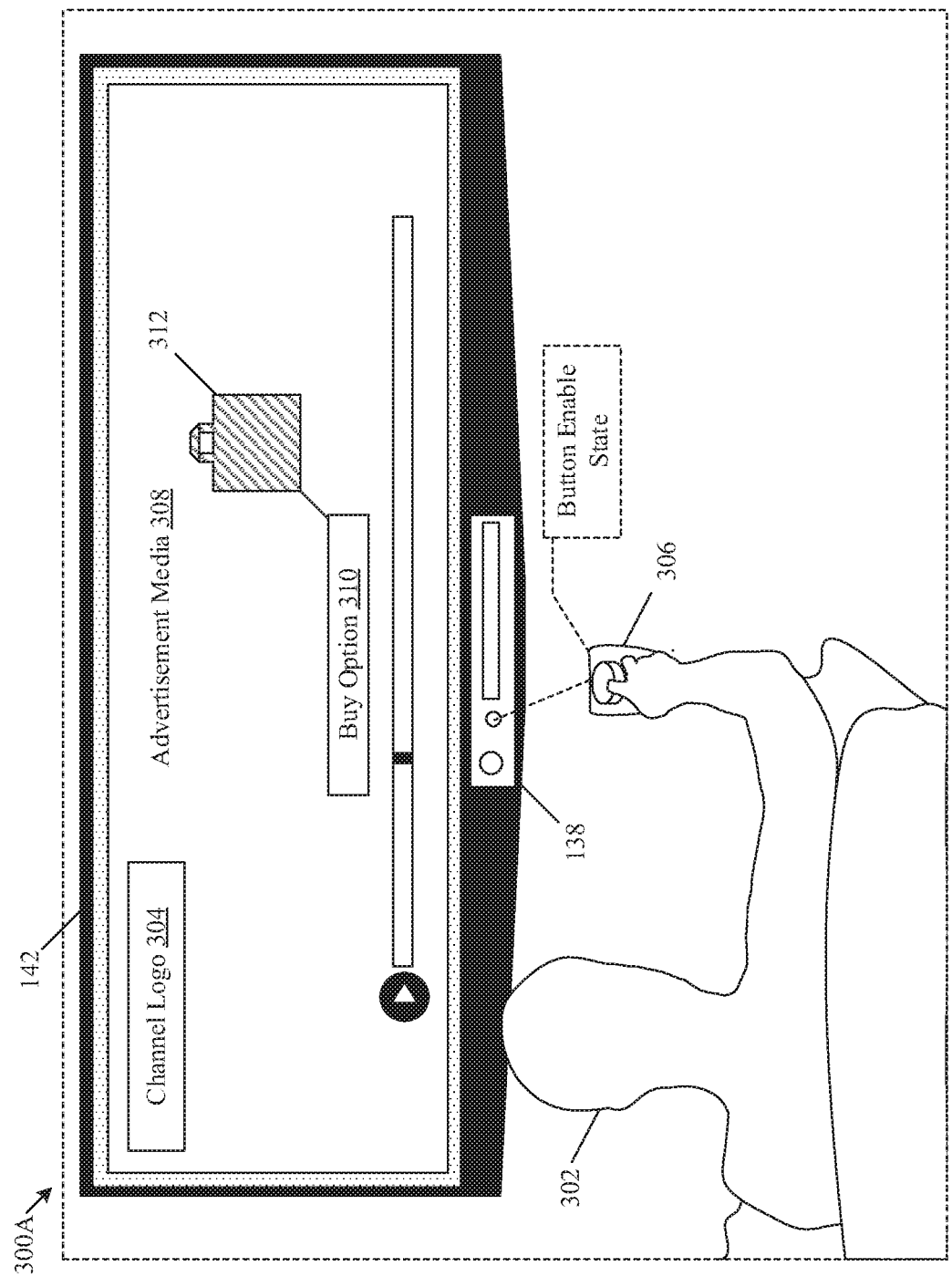

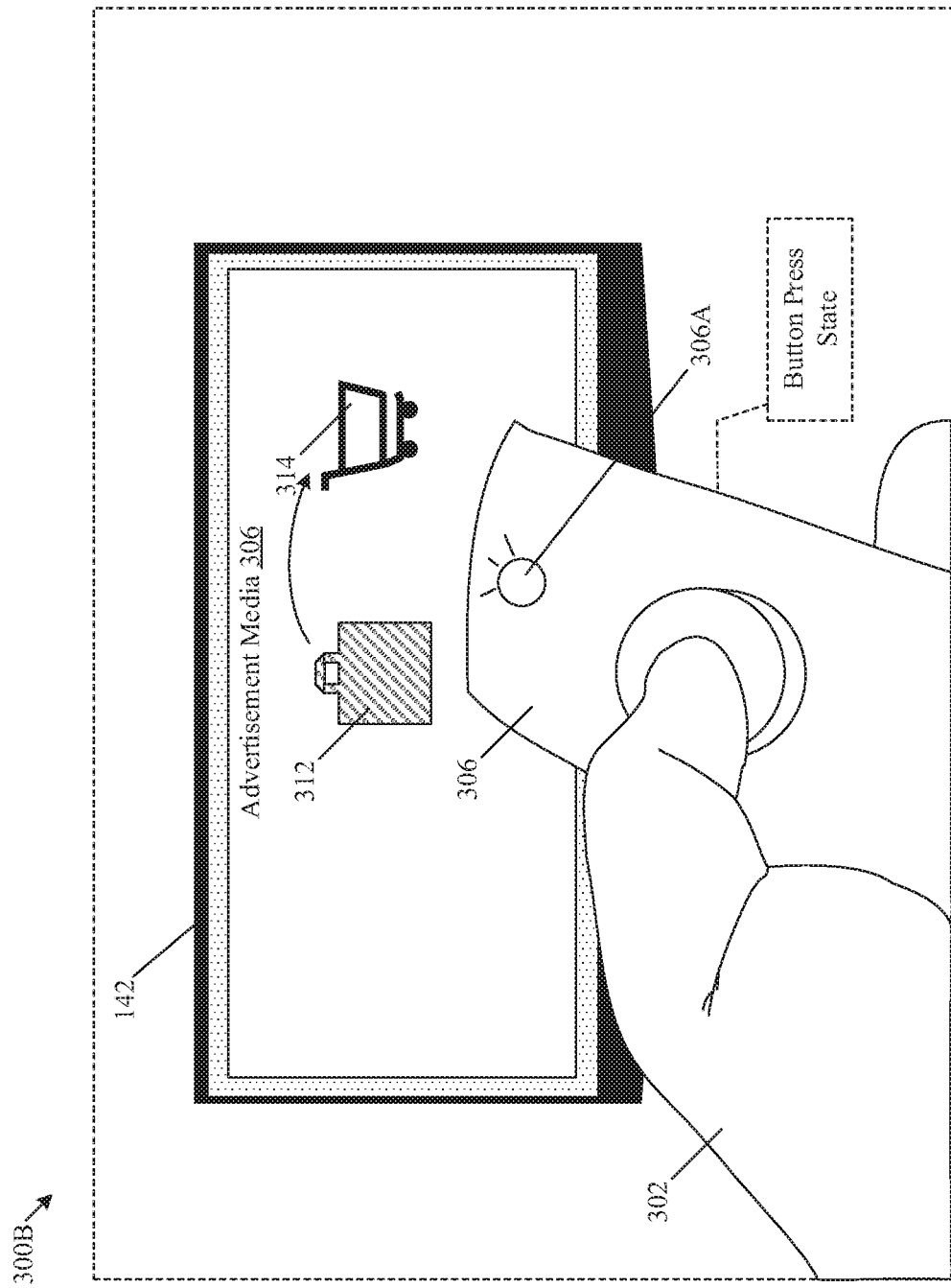

DELIVERY OF DIFFERENT SERVICES THROUGH DIFFERENT CLIENT DEVICES

CROSS-REFERENCE TO RELATED APPLICATIONS/INCORPORATION BY REFERENCE

This patent application makes reference to, claims priority to, claims the benefit of, and is a Continuation Application of U.S. patent application Ser. No. 15/988,308, filed May 24, 2018, which claims benefit of U.S. Application Ser. No. 62/511,190, which was filed on May 25, 2017.

This Application also makes reference to:
U.S. Pat. No. 10,939,169, issued on Mar. 2, 2021.

Each of the above stated patent applications is hereby incorporated herein by reference in its entirety.

FIELD OF TECHNOLOGY

Certain embodiments of the present disclosure relate to television and broadcasting technologies for streaming media networks. More specifically, certain embodiments of the present disclosure relate to delivery of different services through different client devices.

BACKGROUND

Recent technological advancements in broadcasting and media delivery technologies have paved the way for promoters to target relevant audiences across different media networks, such as linear networks, VOD networks, and mobile networks, with promotional content of products or services. Such media networks maintain a curated repository of media content that is delivered to users across different media platforms under ownership of the media network. The media content is distributed according to a schedule with slots dedicated to the promotional content of products or services. Such slots can be placed between two segments of the media content or over a defined region of the media content. The audience that engages with the media content is served with such promotional content.

The media networks that are owners of the media content, provide viewership information of served promotional content to associated promotional networks. However, such viewership information obscures the intent or interest of target audience to subscribe to the products or services upon watching associated promotional content. Additionally, promoters that prefer to target certain audiences for granular periods of time in a day, require intent or interest of a user in associated product or services for such granular periods of time. For example, a restaurant chain may wish to target audiences at different periods of time, such as before breakfast time, lunch time, and dinner time, to raise possibility of users to purchase products items from the restaurant. Moreover, such promoters may request to improve the intent of target audience to purchase promoted products or services, which may be a technically challenging task.

Currently, the ability to measure intent and further improve the intent in a way that encourages each target audience member to purchase product items is performed via detection of impressions or clicks on a promoted media content. However, with varying attention span of audience members, such impressions or clicks result in lower conversion rates. The impressions or clicks are considered an imperfect measure of intent in a time when audience members have a transient attention span. The current technological solutions are inefficient to measure the intent or interest of users to purchase products or services that are promoted through the promotional content. The transient attention span of a target audience affects the conversion of the target audience. Thus, advanced systems may be required that may transform that transient attention to selective sustained attention for viewed promotional content.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and methods are provided for delivery of different services through different client devices, substantially as shown in and/or described in connection with at least one of the figures, as set forth more completely in the claims.

These and other advantages, aspects, and novel features of the present disclosure, as well as details of an illustrated embodiment thereof, will be more fully understood from the following description and drawings.

BRIEF DESCRIPTION OF SEVERAL VIEWS OF THE DRAWINGS

FIGS. 3A and 3B, collectively depict a first exemplary scenario that illustrates a client-side presentation of overlay graphics and receipt of trigger response over presented overlay graphics, via an input device, in accordance with an embodiment of the disclosure.

DETAILED DESCRIPTION OF THE DISCLOSURE

Figure 1:
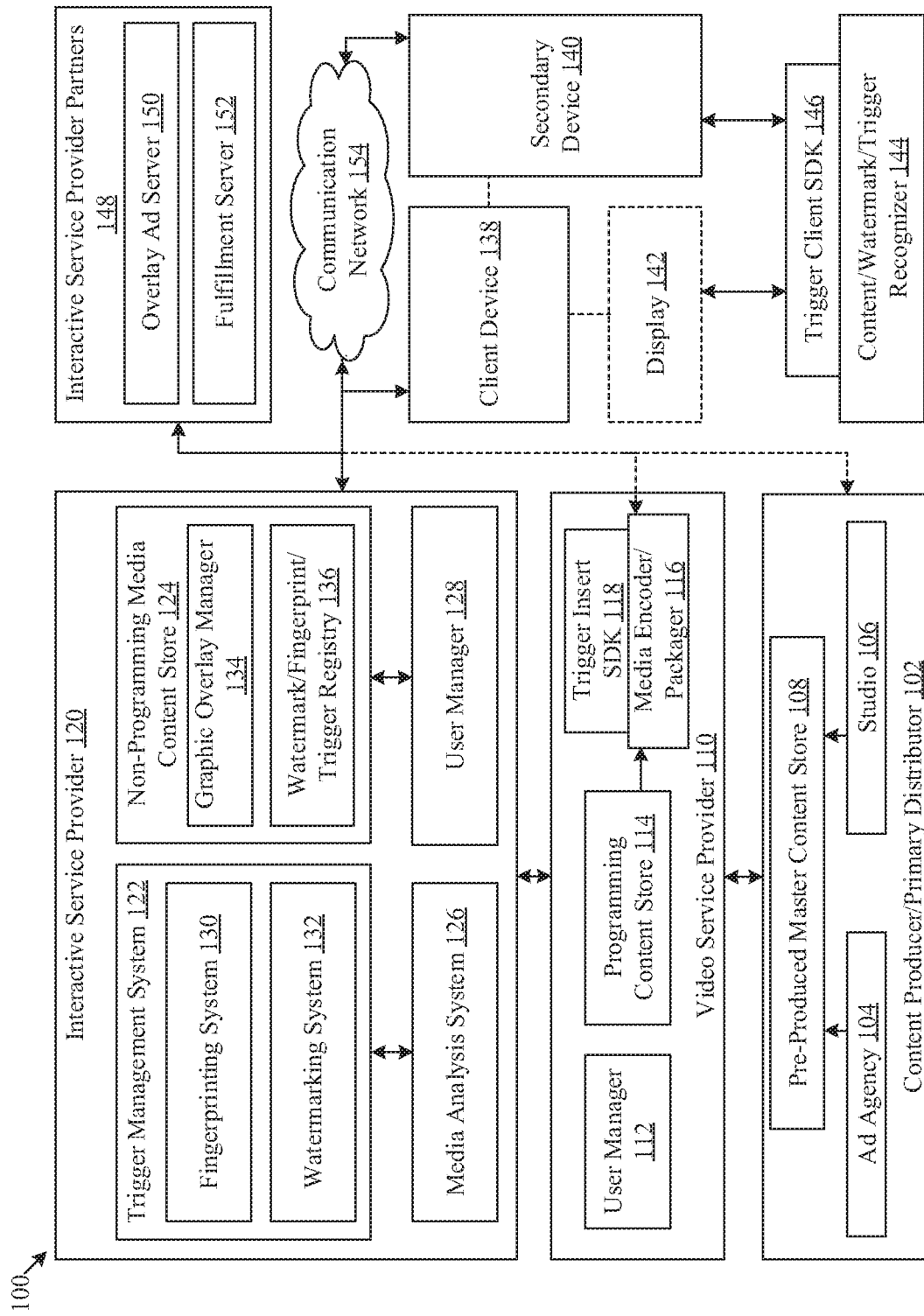
FIG. 1 is a block diagram that illustrates an exemplary network environment for delivery of different services through different client devices, in accordance with an exemplary embodiment of the disclosure.

Certain embodiments of the disclosure may be found in a system and method that handles delivery of a service through a client device or a secondary device paired with the client device. Examples of the different services that may be delivered through the client device 138, may include, but are not limited to an (over-the-top) OTT service through internet, a service that can be delivered through broadcast networks on different client devices, such as (Advanced Television Systems Committee) ATSC smart TVs (e.g., ATSC 3-enabled TV), presentable (visual, aural, etc.) services, consumable services, online services, purchase service, or other access independent services or dependent services. Also, different client devices, through which different services may be delivered, may be an ATSC smart TV capable of reading watermarks for a broadcast implementation, a set top box, an internet-based television, a smartphone, a tablet, and the like. Instead of an OTT service, different services may be delivered via an enabled set-top, ATSC3 TV, or Smart TV with Automatic Content Recognition (ACR), or a legacy TV with a smart second device that is cable of decoding audio watermarks in the media content.

Various embodiments of the disclosure include a system that may include an interactive service provider and the client device. The interactive service provider may include one or more processors and the client device may include a processor. The one or more processors at the interactive service provider may be configured to insert at least one of a plurality of digital watermarks, a plurality of fingerprints, and a plurality of trigger identifiers at a plurality of event opportunities in media content. The media content may be prepared by a video service provider that is different from the interactive service provider. The insertion may be executed by the interactive service provider via a first integration with the video service provider. The media content may include programming media content and non-programming media content and the plurality of event opportunities in the media content may correspond to a plurality of candidate time intervals in a playback duration of the media content.

The processor in the client device may be configured to detect at least one of the inserted plurality of digital watermarks, the plurality of digital fingerprints, and the inserted plurality of trigger identifiers in the media content in a playback duration of the media content at the client device. The detection may be instructed by the interactive service provider via a second integration with the client device. The processor at the client device may be further configured to render a plurality of overlay graphics on the media content for the plurality of candidate time intervals in the media content. The processor at the client device may be further configured to activate, via the second integration, at least one of one or more input devices in vicinity (i.e., a defined proximal range) of the client device or the rendered plurality of overlay graphics. One or more trigger responses may be further received, by the processor in the client device, over an activated overlay graphic rendered on the media content in the playback duration, via the activated one or more input devices. The processor at the client device may be further configured to display an interactive platform (e.g., an interactive interface) on the client device, to enable delivery of at least one service in response to the received one or more trigger responses. The delivery of the services may be enabled at the client device in communication with a fulfillment server that fulfills the delivery of the services to increase a user engagement to select the services. For example, the services may include at least one of a direct payment, a direct transaction, or a direct notification for selected at least one product offering or at least one service offering, and a direct update of the selected at least one product offering or the at least one service offering on a shopping cart, a personalized list, or a social platform.

In accordance with an embodiment, the one or more processors may be further configured to receive, from the video service provider, the media content that includes programming media content and non-programming media content, Also, the one or more processors may be further configured to receive a request for analysis of the media content from the video service provider. The analysis may include at least one digital fingerprinting and digital watermarking of the programming and/or non-programming media content.

In accordance with an embodiment, the one or more processors may be further configured to fingerprint the programming media content and the non-programming media content and further generate fingerprint information for the programming media content and the non-programming media content. The fingerprint information may include at least one of acoustic fingerprint information and video fingerprint information for different segments of the media content, where such different segments may include audio frames or image frames of the media content.

In accordance with an embodiment, the plurality of digital watermarks may be inserted into an audio portion or a video portion of the media content, at the plurality of event opportunities in the media content. The one or more processors may be further configured to generate watermark information that may include metadata for at least one of an acoustic watermark or a video watermark, inserted between different segments of the media content.

In accordance with an embodiment, each event opportunity may correspond to a specified event in the media content and the specified event may correspond to at least one of start credits, end credits, lull points, time-based marked regions, location-based marked regions, context-based marked regions, explicit scene start and end, and product placement opportunities, within the media content. Each trigger identifier of the plurality of trigger identifiers may be at least one, but not limited to, of Society of Cable and Telecom Engineers (SCTE) 35 triggers, SCTE-104 triggers, .m3u8 playlists, .mpd manifest tags, Nielsen ID3 tags, inaudible beacons, image beacons, and data beacons.

In accordance with an embodiment, the processor in the client device may be further configured to pair up at least one of one or more input devices available in vicinity of the client device or the secondary device. The one or more input devices may be paired via at least one of a Bluetooth network, a Wi-Fi network, an internet-based network, a wired local network, or a wireless ad hoc network. In some embodiments, a virtual voice assistant may be enabled on the input device, or at least one of the client device or the secondary device. The input device, which is enabled with the virtual voice assistant, may be configured to actively wait and listen for a trigger identifier in an audio portion of the media content.

In accordance with an embodiment, the processor in the client device may be further configured to instruct the virtual voice assistant to detect at least one beacon within the playback duration of the programming media content/watermark/trigger recognizer. The processor in the client device may be further configured to facilitate a conversation with a user associated with the client device, to receive a trigger response from the user. The trigger response may be received through a user's speech input.

In some cases, some virtual voice assistants may only be loosely (or selectively) paired to the client device based on a proximity and an ability to hear the audio from the client device. It may be the interactive service provider (or a partner) that may configure the client device to detect triggers. The user may have to accept or approve the configuration through a secondary device (e.g., a smartphone) that is different from the client device (e.g., a smart TV) that receives the prepared media content from the video service provider. Alternatively stated, a voice assistant application installed in a secondary device (in vicinity of the client device) may include (or further update or install) an voice assistant service that may offer relevant offers from the interactive service provider (or other partners) while the user is engaged in watching the media content played on the client device. Also, the input device may be loosely paired (or selectively paired for certain specific functionality) or even unpaired with the client device, and therefore, the input device may listen (to recognize) for a trigger identifier in the audio portion of the media content automatically based on instructions from the interactive service provider.

In accordance with an embodiment, the non-programming media content may include promotional media content for at least one of a product offering or a service offering. The promotional media content may include at least one of graphical content, textual content, video content, or animated content.

In accordance with an embodiment, the processor in the client device may be further configured to execute a check to decide whether to activate the one or more paired input devices from a set of input devices, the render plurality of overlay graphics on the media content. The decision is based on the check executed on a defined criteria that is associated with records of previous service requests for the plurality of event opportunities on which the at least one service was delivered in past. The defined criteria may include at least one of a user-defined constraint, an inventory constraint, and a specified threshold count of trigger responses for a product offering or a service offering promoted by the non-programming media content.

In accordance with an embodiment, the one or more processors may be further configured to deliver notifications on at least one of the client device or the secondary device paired with the client device, in response to the received one or more trigger responses. The one or more trigger responses may correspond to one or more user interactions that may be received based on at least one of a touch input, a gesture input, a haptic feedback input, and a voice command input.

FIG. 1 is a block diagram that illustrates an exemplary network environment for delivery of different services through different client devices, in accordance with an exemplary embodiment of the disclosure. FIG. 1 shows a network environment 100 that includes a content producer/primary distributor 102, which may include an ad agency 104, a studio 106, and a pre-produced master content store 108. There is further shown a video service provider 110, which may include a user manager 112, a programming content store 114, a media encoder/packager 116, and a trigger insert software development kit (SDK) 118. An interactive service provider 120 may include a trigger management system 122, a non-programming media content store 124, a media analysis system 126, and a user manager 128. The trigger management system 122 may include a fingerprinting system 130 and a watermarking system 132. Similarly, the non-programming media content store 124 may include a graphic overlay manager 134 and a watermark/fingerprint/trigger registry 136.

The network environment 100 may further include a client device 138, and a secondary device 140. In some embodiments, a display 142 may be an external device coupled to the client device 138 in the network environment 100. In other embodiments, the display 142 may be integrated with the client device 138. The network environment 100 may further include a content/watermark/trigger recognizer 144, a trigger client SDK 146, and interactive service provider partners 148, which may include an overlay ad server 150, and a fulfillment server 152. The aforementioned components in the network environment 100 may be communicatively coupled to each other, via a communication network 154.

The content producer/primary distributor 102, the video service provider 110, the interactive service provider 120, the client device 138, and the interactive service provider partners 148 may together be a part of a system of networks, devices, and/or circuitries, interconnected to each other via the communication network 154. Although not shown in FIG. 1, the interactive service provider 120 may include one or more processors that may be configured to execute all the operations of the interactive service provider 120 and similarly, the client device 138 may include a processor that may be configured to execute all the operations of the client device 138.

The content producer/primary distributor 102 may be a server or a distributed network of servers that may be managed (or owned) by a producer entity or a primary distributor entity. The content producer/primary distributor 102 may store and distribute media content, which includes programming media content (e.g., television shows, live programs, trailers, movies, etc.) as well as non-programming media content (e.g., advertisement videos, graphic advertisements (e.g., bugs, logos, banners, tickers, popups, $\frac{1}{3}^{rd}$ graphics, etc.), promotional videos, and promotional audio, etc.). Also, the content producer/primary distributor 102 may prepare, package, and distribute the media content (programming and/or non-programming) to different networks that serve the media content to different client devices, through a secure (or open) content delivery network. The content producer/primary distributor 102 may include the pre-produced master content store 108 that may be coupled to the ad agency 104 and the studio 106.

The ad agency 104 may be a content producer that creates, plans, and handles different tasks associated with production and distribution of media content (which may be advertisements or other promotional content). The ad agency 104 may produce commercial videos, radio commercials, online advertisements, out-of-home advertisements, and the like, based on an advertising campaign that may be specified by a product/service promoter or owner.

The studio 106 may be a platform that facilitate content producers to create, edit, curate, and/or package different types of media content for distribution to different programming networks (e.g. the video service provider 110) that stream programming media content to different client devices (e.g., the client device 138). In some embodiments, the studio 106 may be an application platform that may be configured to produce media content and curate the produced media content for distribution to different programming networks.

The pre-produced master content store 108 may be a media server or a distributed network of media servers, which may be a part of a content delivery network for producers/distributors of the media content. The pre-produced master content store 108 may be configured to receive produced and/or curated media content (e.g., video ads, promotions videos, overlay graphics (e.g., TV shows, live shows, movies, ad videos, bugs, logos, $\frac{1}{3}^{rd}$ graphics, banners, etc.), promotional audio, etc.) from the ad agency 104 and the studio 106. The pre-produced master content store 108 may be further configured to maintain a curated repository of non-programming media content that is received from the ad agency 104, the studio 106, or other content production and distribution platforms. The pre-produced master content store 108 may also store programming content that may need to be analyzed and have trigger identifiers inserted to mark product placement, e.g., a positive sentiment beach scene over which non-programing content may be overlaid for certain client devices.

The video service provider 110 may be a distribution network (e.g., a television network or a media streaming network) that handles production, curation, and distribution of the media content that may be prepared based on programming and/or non-programming media content, which is received from the content producer/primary distributor 102, or other sources. The video service provider 110 may be a third party distribution network that may be further configured to store programming media content along with other programming or non-programming assets (e.g. the media content received from the content producer/primary distributor 102). The distribution of the media content is managed via different delivery channels that may be managed by the video service provider 110, for example, broadcast channels, internet-based media streaming applications, web channels, podcast channels, radio channels, and the like. The video service provider 110 may include the user manager 112, the programming content store 114, the media encoder/packager 116, and a trigger insert SDK 118.

The user manager 112 may comprise suitable logic, circuitry, and interfaces that may be configured to manage processes and requests that may be associated with user preferences, user activities (or user footprints), user selections, or user profiles across different client devices (e.g., the client device 138). Such user preferences, user activities, user selections, or user profiles may be stored and managed as user-related data in a user database (not shown in FIG. 1).

The user database may comprise suitable logic, circuitry, and interfaces that may be configured to store and manage the user-related data in real time. The user-related data may comprise at least a set of user-authentication data, a subscription data, user preferences, user attributes (e.g., demographic profile (e.g., age, gender, location, income details, etc.) and user footprints (e.g., cookies-based data) that defines user activities on applications/client devices associated with a user. The user-related data may be received as structured and relational or unstructured and non-relational data from one or more data sources. Every time a user request is received by the video service provider 110 to stream the programming media content to a client device (e.g., the client device 138), the user request may be communicated, via the communication network 154, to the user manager 112. In certain implementations, the user manager 112 may be configured to facilitate transactions or payments made on options delivered over the programming media content from the video service provider 110, in conjunction with a transaction system.

The programming content store 114 may be a media server or a distributed network of media servers, which may be a part of a programming content delivery network that is handled by the video service provider 110. The programming content store 114 may be a curated repository of different programming media assets that may be stored along with non-programming media content. In case a user request for programming media content is received, the programming content store 114 may be configured to deliver different programming media assets (e.g., episodes of different shows, movies, trailers, video ads, offers etc.) along with non-programming media content (e.g., overlay graphics, or other promotional content, etc.) to the media encoder/packager 116.

The media encoder/packager 116 may comprise suitable logic, circuitry, and interfaces that may be configured to package different programming media assets to obtain media content for delivery to the client device 138. In some cases, the media content may be further prepared using the non-programming media content (e.g., overlays) at different event opportunities in the media content. The media encoder/packager 116 may be further configured to insert a plurality of trigger identifiers (e.g., Society of Cable and Telecom Engineers (SCTE-35) triggers, SCTE-104 triggers, Nielsen ID3 tags, inaudible beacons, data beacons, etc.) based on integration with the trigger insert SDK 118. The plurality of trigger identifiers may be further utilized to trigger different user options at client devices (e.g., the client device 138)). The media encoder/packager 116 may be further configured to encode the media content and encapsulate the encoded media content in a media stream (e.g., a media stream that includes H.264 video stream and AAC audio stream or an MPEG-2 TS streams). Such media stream may then be delivered to different client devices (e.g., the client device 138) via the communication network 154.

The trigger insert SDK 118 may be an instruction-based platform for a specific application, for example, a controlled insertion of a plurality of trigger identifiers in media content at different event opportunities by an external service provider (e.g., the interactive service provider 120). The trigger insert SDK 118 may be operational in the media encoder/packager 116 of the video service provider 110. The trigger insert SDK 118 may include a development user interface (UI), a set of routines, calls, application programming interfaces (APIs), or other tools, which may be accessible by at least the video service provider 110 and the interactive service provider 120. By integrations with the trigger insert SDK 118, the interactive service provider 120 may directly insert trigger identifiers at different event opportunities in the media content.

The interactive service provider 120 may be a service network (e.g., an affiliate network) that may include a server or a distributed network of servers executing different operations on media content (programming and/or non-programming) for different video service providers (e.g., the video service provider 110). Different operations may be executed based on requirements of different video service providers. The requirements may include at least one of media content (programming or non-programming) analysis, watermarks insertion, fingerprints generation, and trigger identifiers insertion. The media content may be received from different service providers (e.g., the video service provider 110) and a modified version of the media content (after execution of different operations) may be transmitted back to intended video service providers.

The trigger management system 122 may comprise suitable logic, circuitry, and interfaces that may be configured to fingerprint, watermark, and/or schedule insertion of different trigger identifiers in media content (programming and/or non-programming) received from the video service provider 110. The fingerprints, watermarks, or trigger identifiers may be utilized at the client device 138 to present interactive options over programming or non-programming media content (e.g., promotional graphics) served at the client device 138. The trigger management system 122 may be implemented as a computational circuitry or as a set of instructions that are executed on a computational circuitry on one or more servers of the interactive service provider 120.

The non-programming media content store 124 may be a server, a distributed network of servers, or a set of applications that are executed on the server or the distributed network of servers. The operations of the non-programming media content store 124 may be handled by the interactive service provider 120. The non-programming media content store 124 may be configured to manage overlay of graphical assets at different client devices (e.g., the client device 138) and further maintain a database of watermark information, fingerprint information, or event information associated with each trigger identifier for media content (programming or non-programming) received from the video service provider 110.

The media analysis system 126 may comprise suitable logic, circuitry, and interfaces that may be configured to determine the one or more event opportunity points within the media content (programming or non-programming) that is received from a third party video service provider (e.g., the video service provider 110). The media analysis system 126 may be further configured to identify information associated with different segments (e.g., specific portions, specific scenes, POD durations, commercial breaks, etc.) in the media content. The information may be identified based on analysis of a context, a user preference, or a defined goal (associated with flights of an advertisement campaign) of different segments in the media content (programming and/or non-programming). Such information may include different attributes, for example, a duration, a tag (or metadata), a suitable overlay asset for an event opportunity, a total number of event opportunities in a segment, and the like. The determined one or more event opportunity points and associated information may be transmitted to the trigger management system 122 and the non-programming media content store 124.

The user manager 128 may be similar to the user manager 112 of the video service provider 110. Therefore, the details of the user manager 128 has been omitted from the disclosure for the sake of brevity. In some cases, however, the user manager 128 may include separate databases, with each separate database configured to store user-related data from a specific video service provider (e.g., the video service provider 110).

The fingerprinting system 130 may comprise suitable logic, circuitry, and interfaces that may be configured to fingerprint an audio portion and/or a video portion of the media content (programming and/or non-programming) that is received from a specific video service provider (e.g., the video service provider 110). The fingerprinting system 130 may also fingerprint the programing content to serve as a triggering mechanism for different overlay (or event) opportunities in the media content. The fingerprinting system 130 may generate fingerprint information, which may include at least one of acoustic fingerprint information and video fingerprint information for different segments (or selected audio or image frames) of the media content (programming and/or non-programming). The generated fingerprint information for an asset (programming and/or non-programming) may be utilized to uniquely identify and detect playback of the asset (programming and/or non-programming) at different client devices (e.g., the client device 138).

The watermarking system 132 may comprise suitable logic, circuitry, and interfaces that may be configured to insert digital watermarks (perceptible or imperceptible) into an audio portion and/or a video portion of the media content (programming and/or non-programming) received from a specific video service provider (e.g., the video service provider 110). The watermarking system 132 may generate watermark information, which may include metadata for at least one of an acoustic watermark or a video watermark inserted between different segments (or selected audio or image frames) of the media content (programming and/or non-programming). The generated watermark information for an asset (programming and/or non-programming) may be utilized to uniquely identify and detect playback of the asset (programming and/or non-programming) at different client devices (e.g., the client device 138). The watermarking system 132 may also watermark the programing content to serve as a triggering mechanism for different overlay opportunities in the media content.

The graphic overlay manager 134 may comprise suitable logic, circuitry, and interfaces that may be configured to manage an overlay schedule database for a repository of overlay graphics (e.g., logos, bugs, banners, tickers, $\frac{1}{3}^{rd}$ graphics, sliders, etc.). The overlay schedule may be delivered to the graphic overlay manager 134 by different content producers/primary distributors (e.g., the content producer/primary distributor 102). The overlay schedule may include details of what to overlay, when to overlay, for what duration to overlay and how that overlay should be presented at different devices (e.g., the client device 138).

The watermark/fingerprint/trigger registry 136 may comprise suitable logic, circuitry, and interfaces that may be configured to manage a database or a set of databases for different types of information received from the fingerprinting system 130, the watermarking system 132, and/or a trigger scheduler (not shown in FIG. 1). The different types of information may include fingerprint information, watermark information, and event information for each portion (or asset) in received media content (programming and/or non-programming) from the video service provider 110. Such types of information may be utilized to search for metadata and details of an event trigger that is detected at different client devices (e.g., the client device 138). Also, such types of information may be utilized to tracks watermarks associated with programming media content. The event trigger may correspond to an event opportunity, details of which may be specified in the watermark/fingerprint/trigger registry 136.

The client device 138 may comprise suitable logic, circuitry, and interfaces that may be configured to request the video service provider 110 to stream programming media content at the client device 138. The client device 138 may also request the video service provider 110 to stream programming media content (e.g., TV shows, live matches, movies, etc.) along with further requests to the interactive service provider 120 for activation of trigger inputs (overlaid graphical buttons or physical input devices). The requests may be associated with a user intention to consume/engage/interact (e.g., purchase, sell, bid, share, etc.) with the non-programming media content presented along with the programming media content. Such trigger inputs may be activated for various event opportunities in the media content, for example, television programming or on-demand shows (e.g. dramas, movies, advertisements, contextually relevant product placement scenes, etc.), at a display view of the client device 138. Examples of the client device 138 may include, but are not limited to, a Set-Top-Box (STB), an (internet protocol television) IPTV, a hybrid box, a cable converter, a smartphone, a laptop, and a tablet, a smart TV, a digital media player (for example, "Fire" TV, or other brand-based TV, etc.). Also the client device 138, through which different services may be delivered, may be an ATSC smart TV capable of reading watermarks for a broadcast implementation, a set top box, an internet-based television, a smartphone, a tablet, a set-top box, an ATSC3 TV, or a Smart TV with ACR (automatic content recognition), or a legacy TV with a smart second device that is cable of decoding an audio watermark.

In some embodiments, the client device 138 may facilitate playback of the programming media content via the display 142 that may be peripherally integrated with the client device 138. Examples of the display 142 may include, but not limited to a television display (e.g. Liquid Crystal Display (LCD), Light Emitting Diode (LED) display, organic light emitting diodes (OLED) display, plasma display, Thin-Film Transistor (TFT) display, etc.) a projector screen, a computer monitor, a three dimensional (3D) display, and an (Augmented Reality/Virtual Reality (AR/VR display).

The secondary device 140 may comprise suitable logic, circuitry, and interfaces that may be configured to display trigger inputs (overlaid graphic buttons) in response to an event trigger that occurs based on a detection of a trigger identifier with the playback of the media content at the client device 138. Additionally, the secondary device 140 may be configured to display notifications, payment options, or, promotional content, via at least one delivery platform accessible on the secondary device 140. The one or more delivery platforms may correspond to a communication exchange platform that may incorporate visual, audible, or executable data to serve notifications or associated promotional content onto the secondary device 140. Examples of the one or more delivery platforms may include, but not limited to an email platform, a mobile messaging platform, a webpage, a podcast, and a push notification. Examples of the secondary device 140 may include, but not limited to smartphones, tablets, phablets, smart watches, smart glasses, and smart speakers/with or without artificially intelligent (AI) conversational agents. In some cases, the secondary device 140, for e.g., a smart conversational agent, may be configured to detect the audio watermark itself and may not rely on the client device 138 for detection.

The content/watermark/trigger recognizer 144 may comprise suitable logic, circuitry, and interfaces that may be configured to identify trigger identifiers, inserted watermarks, or media content based on fingerprints at the client device 138, based on integration with the interactive service provider 120, via the trigger client SDK 146. Alternatively stated, the content/watermark/trigger recognizer 144 may detect and/or identify information associated a trigger identifier, an inserted watermark, or a fingerprint while the programming media content (along with non-programming media content) is played at the client device 138. Along with trigger client SDK 146, the content/watermark/trigger recognizer 144 may communicate with the interactive service provider 120, via a set of calls or other instructions (e.g., API calls), to identify information (e.g., event information, watermark information, fingerprint information, etc.) in response to a detection of an event trigger at the client device 138.

The trigger client SDK 146 may be an instruction-based platform for a specific application, for example, an instruction based identification of information (e.g., event information, watermark information, fingerprint information, etc.) in response to a detection of an event trigger at the client device 138. The trigger insert SDK 118 may be operational, at the client-side, i.e., at the client device 138, in the content/watermark/trigger recognizer 144. Similar to the trigger insert SDK 118, the trigger client SDK 146 may include a development UI, a set of routines, calls, APIs, or other tools, which may be accessible by at least the content/watermark/trigger recognizer 144 and the client device 138. By integrations with the trigger client SDK 146, the interactive service provider 120 may directly communicate certain information (e.g., event information, watermark information, fingerprint information, etc.) in response to a detection of an event trigger at the client device 138.

The interactive service provider partners 148 may be a group of service networks (e.g., different affiliate networks) that may have partnerships and affiliations with the video service provider 110 and the interactive service provider 120. The interactive service provider partners 148 may include a server or a distributed network of servers that serve overlay advertisement graphics (or media content) to the client device 138 in response to request from the client device. Also, the different operations on media content (programming or non-programming) for different video service providers (e.g., the video service provider 110). Different operations may be executed based on requirements of different video service providers.

The overlay ad server 150 may comprise suitable logic, circuitry, and interfaces that may be configured to design or produce and distribute overlay graphics along with associated metadata to the client device 138 in response to requests received from the client device 138. A repository of overlay graphics (e.g., bugs, logos, tickers, banners, sliders, $\frac{1}{3}^{rd}$ graphics, full screen graphics, etc.) may also be maintained at the overlay ad server 150.

The fulfillment server 152 may comprise suitable logic, circuitry, and interfaces that may be configured to deliver a service (e.g., payment service, order service, bid/reverse bidding service, registration, subscription, social sharing, etc.) to a user in response to a request from different client devices, such as the client device 138.

The communication network 154 may comprise suitable logic, circuitry, and interfaces that may be configured to manage a plurality of network ports and a plurality of communication channels for transmission and reception of communication data (for e.g. media streams, request data, metadata, database files, web data, etc.). The communication data may correspond to data received and/or exchanged among the content producer/primary distributor 102. The video service provider 110, the client device 138, the secondary device 140, the content/watermark/trigger recognizer 144, the trigger client SDK 146, and interactive service provider partners 148, via the communication network 154. Each network port may correspond to a virtual address (or a physical machine address) for transmission and reception of the communication data. For example, the virtual address may be an Internet Protocol version 4 (IPV4) or an Internet Protocol version 6 (IPV6) address, and the physical address may be a media access control (MAC) address. An application layer may be associated with the communication network 154 for implementation of communication protocols on one or more communication requests from at least one of the one or more computing devices Examples of the communication protocol may include, but not limited to a Hypertext Transfer Protocol (HTTP), a File Transfer Protocol (FTP), a Simple Mail Transfer Protocol (SMTP), a Domain Name Server (DNS) protocol, and a Common Management Information Protocol (CMIP) Over Transmission Control Protocol/Internet Protocol TCP/IP (CMOT).

Examples of the communication channels may include, but are not limited to a wireless channel, a wired channel, a combination of wireless and wired channel thereof. The wireless or wired channel may be associated with a data standard which may be defined by one of a Local Area Network (LAN), a Personal Area Network (PAN), a Wireless Local Area Network (WLAN), a Wireless Sensor Network (WSN), a Wireless Area Network (WAN), and a Wireless Wide Area Network (WWAN). Additionally, the wired channel may be selected on the basis of bandwidth criteria. For example, an optical fiber channel may be used for a high bandwidth communication, and a coaxial cable (or Ethernet-based communication channel) may be used for moderate bandwidth communication.

In one scenario, the communication network 154 may be an internet based network. For such networks, a delivery standard may be used, for example, National Television System Committee (NTSC), (Phase Alternating Line) PAL, Sequential Color with Memory (SECAM), Moving Picture Experts Group (MPEG), and (Digital Video Broadcasting) DVB-S/DVB-S2 or (Integrated Services Digital Broadcasting) ISDB-S. Although, only a single communication network has been illustrated in FIG. 1, there may be more than one communication networks that may or may not share resources to optimally deliver programming content and other non-programming content to various connected client devices.

In operation, a request (i.e. a user request or a client request) may be transmitted by the client device 138 to the video service provider 110, via the communication network 154. The request may be made for an instructed delivery and playback of programming media content at the client device 138. In some embodiments, along with the transmitted request, the client device 138 may also transmit request information, such as user information, constraint information (e.g. device constraints, network constraints, user-specified constraints, etc.), stored/collected user preferences (favorite shows, preferred products/services, frequently/recently searched terms, etc.), user attributes (e.g., demographic details, such as age, gender, income bracket, and location), and digital footprints. Examples of digital footprints includes, but are not limited to traceable, inferred digital activities, analyzed digital activities, actions, contributions, and communications on internet or on digital devices, such as the client device 138 or the secondary device 140. The request along with the request information may be stored in a user database of the user manager 112 present in a network of the video service provider 110.

In some embodiments, the client device 138 may be communicatively coupled to a proxy server (not shown in FIG. 1) that acts as an intermediary between the client device 138 and at least one of the content producer/primary distributor 102, the video service provider 110, the interactive service provider 120, the interactive service provider partners 148, or the content/watermark/trigger recognizer 144. All the requests from the client device 138 may be parsed, processed, and/or routed by the proxy server to at least the content producer/primary distributor 102, the video service provider 110, the interactive service provider 120, the interactive service provider partners 148, and the content/watermark/trigger recognizer 144.

The content producer/primary distributor 102 may be configured to transmit media content (programming and/or non-programming, for e.g., TV shows, live shows, movies, advertisement videos, graphics (e.g., bugs, logos, banners, tickers, popups, ⅓rd graphics, etc.), promotional videos, promotional audio, etc.) to the video service provider 110. The non-programming media content may include promotional media content for at least one of a product offering or a service offering. The promotional media content may include at least one of graphical content, textual content, video content, or animated content. The non-programming media content may be transmitted by the content producer/primary distributor 102 in an attempt to have a user engagement with the non-programming media content that may be played along with programming media content at the client device 138. Examples of the programming media content may include, but are not limited to episodes of different shows, movies, live matches, trailers, program recap, programs to be aired, program highlights, sports highlight, sports analysis, news feed, or other television programming, and on-demand shows (e.g. pre-produced or live shows, etc.), television ads, and traditional video advertisements.

The programming content store 114 may be configured to receive the media content (programming and/or non-programming) from the pre-produced master content store 108 of the content producer/primary distributor 102. The received media content (programming and/or non-programming) may be stored along with the media assets (e.g., individual episodes, segments, or curated portions of shows, live content, or pre-packaged content) at the programming content store 114. In some embodiments, the video service provider 110 may be configured to transmit the received media content (programming and/or non-programming) to the interactive service provider 120. Additionally, a request may be transmitted by the video service provider 110 to the interactive service provider 120, for analysis of the media content (programming and/or non-programming) and insertion of trigger identifiers with the media content (programming and/or non-programming). When detected, such trigger identifiers may indicate event opportunities in a playback duration of the media content that may be served by the video service provider 110 at the client device 138.

The event opportunities may correspond to candidate time intervals, which may be pre-specified or identified based on an analysis of the programming media content. Such event opportunity may correspond to a specified event within the media content and such specified event may correspond to, but not limited to start credits, end credits, lull points, time-based marked regions, location-based marked regions, context-based marked regions, explicit scene start and end, and product placement opportunities, within the programming media content.

The interactive service provider 120 may be configured to receive the media content (programming and/or non-programming) along with a request for media analysis and insertion of trigger identifiers at different event opportunities in the media content. Initially, the media analysis system 126 may be configured to analyze the media content (programming and/or non-programing) received from the video service provider 110 to identify slots, contextual points, product placement opportunities, etc., in the media content. More specifically, the media analysis system 126 may be configured to analyze the programming media content (i.e., TV shows, movies, etc.) to look for non-programming content, such as brand logos, but may also look for more contextually relevant opportunities, such as a coffee scene or a breakfast scene, or a restraint scene. Such contextually relevant opportunities may translate to ad or offer placement opportunities that may be relevant to an advertiser and a non-programming media element can be overlaid at the contextually relevant opportunity, e.g., a burger order logo (user-selectable) over a breakfast scene. The media analysis system 126 may also analyze advertisements so as to make such advertisements interactive at the time of presentation on the client device 138.

In some embodiments, the media analysis system 126 may implement a content recognition service (not shown in FIG. 1) that may be configured to execute operations associated with content recognition on the media content received from different content producers/content distributors (e.g., the content producer/primary distributor 102). The content recognition service may operate as a statistical signal processing engine that may execute operations for the recognition of programming and/or non-programming assets (e.g., contextually relevant segments in programs, programming videos, video advertisements, etc.) in the media content. The content recognition service may further identify different attributes (e.g., audio or video fingerprints) of the programming and/or non-programming media assets (as part of media content) through implementation of a technique, such as acoustic fingerprinting, digital watermarking, and digital video fingerprinting. In certain implementations, supervised or unsupervised machine learning, deep learning, neural network, or artificially intelligence based techniques may be implemented to facilitate precise determination of different attributes of the media items in the media content. In certain embodiments, the content recognition service may be implemented on a specialized circuitry or an application at the trigger management system 122. For such implementations, the content recognition service may utilize computational resources of a graphical processing unit (GPU) at the trigger management system 122.

After the analysis, different event opportunity points that are specified by the video service provider 110 may be identified along with metadata and other details of different programming and/or non-programming assets (as part of the media content) by the media analysis system 126. Examples of the different features may include, but not limited to contextual information of different scenes/portions of a programming and/or a non-programming asset, a point in time to trigger an overlay in a programming and/or a non-programming asset, a suitable position in a programming and/or a non-programming asset where an overlay may be placed, or other playback information (e.g., playback duration, start/end time stamps, etc.). The contextual information may be a context of a scene, for example, sports, health, baby products, car promo, and the like. A record of the analysis may be updated to the trigger management system 122. The trigger management system 122 may store the record generated post the analysis of the media content.

In some embodiments, the received request from the video service provider 110 may also include information that specifies a type of detection that should be used at the client device 138. The type of detection may include, but not limited to, watermark detection, fingerprint detection, trigger identifier detection, tags-based detection, or a combination thereof. Based on the type of detection, the interactive service provider 120 may insert fingerprint, watermark, trigger identifiers, or associated tags with the programming media content. In other embodiments, in absence of such information with the received request, the interactive service provider 120 may be configured to optimally select a type of detection suitable for execution at the client device 138.

In accordance with an embodiment, the fingerprinting system 130 may be configured to fingerprint the programming media content and the non-programming media content and generate fingerprint information for the programming media content and the non-programming media content. The fingerprint information may include at least one of acoustic fingerprint information and video fingerprint information for different segments (or selected audio or image frames) of the media content. The generated fingerprint information for an asset (programming and/or non-programming) may be utilized to uniquely identify and detect playback of the asset at different client devices (e.g., the client device 138).

As an example, the acoustic fingerprint information may include, but not limited to, an average zero crossing rate, an estimated tempo, an average spectrum, a spectral flatness, and prominent tones across a set of frequency bands, a bandwidth, and a spectrogram for a segment of the audio portion. Similarly, the video fingerprint information may include, but not limited to, histogram data, intensity information, motion vectors, feature points extracted based on application of at least one of Scale Invariant Feature Transform (SIFT), Speeded Up Robust Features (SURF), Oriented Brief and Fast (ORB), and Histogram of Oriented Gradients (HOG), and the like.

In accordance with another embodiment, the watermarking system 132 may be configured to insert digital watermarks (visually or auditory perceptible or imperceptible) into an audio portion and/or a video portion of the media content (programming and/or non-programming) at analyzed event opportunities in the media content. The watermarking system 132 may be configured to generate watermark information, which may include metadata for at least one of an acoustic watermark or a video watermark inserted between different segments (or selected audio or image frames) of the media content. The generated watermark information for an asset in the media content may be utilized to uniquely identify and detect playback of the asset at the client device 138. The watermark information may further include details (e.g., title, duration, start time, end time, tags, etc.) of an asset in the media content.

In some cases, the watermarks and/or fingerprints may be primarily intended for the programming media content to identify events for triggers. The non-programming assets may be typical fingerprinted or watermarked to detect playback for tracking or in the case the non-programming content is overlaid in the broadcast distribution to make it interactive on the enabled client devices (e.g., the client device 138). As an example, in a TV show with a beach scene, fingerprints, watermarks, or trigger identifiers, may be generated for a positive sentiment beach scene. Such fingerprints, watermarks, or trigger identifiers may indicate an event opportunity for which a personalized travel or vacation offer may be served on the client device 138, for viewers that may like going to the beach. The watermark/fingerprint/trigger registry 136 may also store information around non-programming content, such as a promotional overlay for a new TV show, to enable the interactive service provider 120 to keep a track of users who may have viewed the promotional overlay for the new TV show. The interactive service provider 120 may also allow the user (through the client device 138 or other input devices) to act upon the promotional overlay, such as scheduling a DVR recording or adding it to the watch list.

In certain embodiments, the watermarking system 132 may also analyze and insert digital watermarks in the programming media content to enable user engagement (in response to user inputs) at the client device 138 (or other input devices) with different product placements during the playback of a program, e.g., a TV show at the client device 138. Also, such digital watermarks may also be used to garner revenue from contextual advertising, i.e., a "food brand" bug (i.e., an on-screen graphic) may be presented during a breakfast scene in a program played at the client device 138, where coffee is consumed in the breakfast scene. Also, such digital watermarks may be utilized to insert a logo on a coffee cup itself to enable real-time product placement to a highest bidder for that customer.

The trigger management system 122 may be further configured to store the generated fingerprint information and the watermark information in the watermark/fingerprint/ trigger registry 136. After insertion of at least one of fingerprints, watermarks, or tags with the media content, the interactive service provider 120 may be configured to transmit the media content (programming and/or non-programming) inserted with at least one of watermarks or fingerprints back to the video service provider 110. The programming content store 114 at the video service provider 110 may be configured to receive and store the media content inserted with at least one of watermarks or fingerprints. Further, the programming content store 114 may be further configured to transfer the media content inserted with at least one of watermarks or fingerprints to the media encoder/packager 116.

In some embodiments, when the media content is prepared for delivery to the client device by the media encoder/ packager 116, the video service provider 110 may be configured to transmit a request to the interactive service provider 120. Such request is transmitted to insert a plurality of trigger identifiers (e.g., Society of Cable and Telecom Engineers (SCTE-35) triggers, SCTE-104 triggers, .m3u8 playlists, .mpd manifest tags, Nielsen ID3 tags, inaudible beacons, data beacons, etc.) at different event opportunities in the media content. The request may be transmitted via a set of calls (e.g., API calls) initialized by the trigger insert SDK 118 that is present with the video service provider 110.

In response to the set of calls via the trigger insert SDK 118, the video service provider 110 may create API-based integration with the interactive service provider 120. The API-based integration may facilitate the interactive service provider 120 to insert/embed the plurality of trigger identifiers at different event opportunities in the media content. A trigger scheduler (not shown in FIG. 1) in the trigger management system 122 may be configured to receive the request and generate a plurality of trigger identifiers (e.g., a trigger identifier may include "255 bytes" of information that includes at least an asset or event identifier (ID)). The size of a trigger identifier may be less than or more than 255 bytes, without a deviation from scope of the disclosure. The trigger scheduler may also generate event information for each generated trigger identifier. The event information may include, but not limited to, asset ID of a media asset, an overlay position, a graphic asset that may be overlaid, an overlay duration, and/or other presentation attributes (e.g., on-screen position, transparency, etc.).

The trigger scheduler may be further configured to transmit the generated plurality of trigger identifiers in response to the received request from the video service provider 110. The trigger scheduler may be further configured to insert the plurality of trigger identifiers at a plurality of event opportunities in media content prepared by the video service provider 110. The video service provider 110 may be different from the interactive service provider 120. The insertion may be executed by the interactive service provider 120 via a first integration with the video service provider 110. The first integration may correspond to an API-based integration, of the interactive service provider 120 with the video service provider 110, based on the trigger insert SDK 118. In some cases, the prepared media content may include a client manifest, which is transmitted along with a media stream (or separately) of the prepared media content. The client manifest may be utilized to call for stream segments and/or may include the plurality of trigger identifiers along with the trigger metadata (e.g. trigger duration, trigger end time, trigger start time, etc.). The trigger scheduler may be further configured to store the generated event information associated with each trigger identifier in the watermark/ fingerprint/trigger registry 136.

In certain embodiments, the trigger management system 122 may include a tagging system (not shown in FIG. 1). The tagging system may also place one or more tags with the non-programming media content. Such tags may be invoked at the client device 138 while non-programming media content is played at the client device 138. Each tag may include, but is not limited to, at least a pointer for a defined playback duration in a candidate time interval (e.g., "00:33: 43"-"00:35:43" or "2 minutes" from "00:33:43"). The one or more tags may be transmitted along with a client manifest that may be created by the media encoder/packager 116, in conjunction with inputs from the trigger insert SDK 118. The client manifest may be interpreted at the client device 138 and the one or more tags present along with the client manifest may be represented by at least one of a signal, a beacon, a SCTE-35 message, a marker, textual information, binary information, visual information, aural information, and the like.

In certain embodiments, the video service provider 110 may be configured to modify one or more of the plurality of trigger identifiers inserted in the prepared media content at the media encoder/packager 116. For example, the modification may include, but not limited to, resetting the position of the trigger identifier in the prepared media content, a deletion of a trigger identifier previously inserted in the prepared media content, a change in metadata of the trigger identifier (e.g., trigger ID), and the like. In other embodiments, instead of modification, the video service provider 110 may be configured to add a new trigger identifier at an event opportunity in the prepared media content. The modification of one or more of the plurality of trigger identifiers or addition of a new trigger identifier may be done based on resources and services of the trigger insert SDK 118. The video service provider 110 may be configured to generate, using the trigger insert SDK 118, event information for each modified trigger identifier or each new trigger identifier added in the prepared media content. After every modification or update, the video service provider 110 communicates the generated event information and/or an event log (which includes a list of modifications) for an update at the watermark/fingerprint/trigger registry 136. The watermark/fingerprint/trigger registry 136 may include databases that may be sorted, curated, updated, and structured such that in an event of a call from the client device 138, a search may be executed in such databases to extract information (i.e., watermark information, fingerprint information, or event information) that corresponds to a detected watermark, fingerprint, or trigger identifier at the client device 138.

In accordance with an embodiment, the media encoder/ packager 116 at the video service provider 110 may be further configured to transmit a media stream of the prepared media content to the client device 138, via the communication network 154. The media stream may be generated by encapsulation of the prepared media content (inserted with trigger identifiers) in a transport stream based on a digital streaming protocol or a real time streaming protocol (RTSP)). Examples of the digital streaming protocol may include, but are not limited to, HTTP Live Streaming (HLS), Adaptive Bitrate Streaming (ABR), MPEG-DASH, Smooth Streaming, and HTTP Dynamic Streaming (HDS).

At the client-end, the client device 138 may be configured to receive the media stream of the prepared media content, via the communication network 154. In some embodiments, instead of the client device 138, a proxy server may receive the media stream of the prepared media content and further transmit the same media stream to the client device 138, via the communication network 154. Upon reception, the client device 138 may execute playback operations (e.g., decoding media content, rendering user interface, loading non-graphical and graphical elements, initializing player, displaying decoded media content onto a player window, etc.) for the programming media content onto the display 142 associated with the client device 138.

The plurality of trigger identifiers may be present with the media content (e.g., in the client manifest or embedded in the media stream that includes the programming and/or the non-programming media content) that is served at the client device 138. In some cases, digital watermarks (audio or video watermarks generated by the watermarking system 132) may be present at different candidate points (or event opportunities in the media content. Also, in other cases, digital fingerprints (audio or video fingerprints generated by the fingerprinting system 130) may be present with the media content. Therefore, the client device 138 may be configured to detect at least one of the inserted digital watermarks, the digital fingerprints (of different segments or scenes, which may render an event opportunity), and the plurality of trigger identifiers present with the media content. The detection may be instructed by the interactive service provider 120 via a second integration with the client device 138. The second integration may correspond to an API-based integration of the interactive service provider 120 with the client device 138 based on the trigger client SDK 146.

In some cases, the client application operational on the client device 138 and responsible for playback of the media content may lack the capability to detect and recognize at least one of the inserted digital watermarks, the digital fingerprints, and the plurality of trigger identifiers in the media content. Therefore, in such cases, the client device 138 may be configured to request the content/watermark/ trigger recognizer 144 to detect and recognize at least one of the inserted digital watermarks, the digital fingerprints, and the plurality of trigger identifiers in the media content, while the client application is playing the media content onto the display 142.

The content/watermark/trigger recognizer 144 may detect at least one of the inserted digital watermarks, the digital fingerprints, and the plurality of trigger identifiers in the media content. For the detected digital watermarks, digital fingerprints, or trigger identifiers, the content/watermark/ trigger recognizer 144 may utilize the functionalities of the trigger client SDK 146 to identify information (e.g., watermark information, fingerprint information, event information, etc.) associated with the detected digital watermarks, digital fingerprints, or trigger identifiers. Such information may include details of what to do next, when the detection occurs, and where to request for information on the next action. For example, detection of a trigger identifier may lead to determination of an event ID (e.g., 255 bytes ID).

The event ID may be insufficient for the client device 138 to execute an action, such as contacting the overlay ad server 150, retrieving the overlay graphics, presenting the retrieved overlay graphics, and activating the trigger inputs (input devices or overlay trigger inputs). Therefore, the content/ watermark/trigger recognizer 144 may be configured to transmit a request to watermark/fingerprint/trigger registry 136 to determine at least one of fingerprint information, watermark information, or event information for detected digital fingerprints, detected digital watermarks, or one or more detected trigger identifiers, respectively. In some cases, the request may be transmitted through instruction calls raised by the trigger client SDK 146 on behalf of the client device 138.

The watermark/fingerprint/trigger registry 136 may be configured to receive the request from the content/watermark/trigger recognizer 144, or the trigger client SDK 146. In response to the received request, the watermark/fingerprint/trigger registry 136 may be configured to search for at least one of fingerprint information, watermark information, or event information for detected digital fingerprints, detected digital watermarks, or one or more detected trigger identifiers, respectively. The watermark/fingerprint/trigger registry 136 may be further configured to communicate the fingerprint information, the watermark information, or the event information to the client device 138, for detected digital fingerprints, detected digital watermarks, or one or more detected trigger identifiers, respectively.

The client device 138 may be configured to receive the communicated fingerprint information, the watermark information, or the event information from the watermark/fingerprint/trigger registry 136, via the trigger client SDK 146. The fingerprint information, the watermark information, or the event information may include instructions (or other metadata) that specify at least an address (e.g., IP address) of the overlay ad server 150, an asset identifier (ID) of an overlay graphic that has to be presented at the event opportunity, permission information (e.g., information to access data from the overlay ad server 150), and the like. For each event opportunity, the client device 138 may seek permissions to present an overlay graphic onto the display 142, from at least one of the video service provider 110 and the graphic overlay manager 134. In response to permission requests, the client device 138 may receive decisions regarding whether to present an overlay graphic onto the display 142 for a detected event opportunity (specified by a watermark, a fingerprint, or a trigger identifier). The client device 138 may receive such decisions (or decisioning information) from the video service provider 110 or the interactive service provider (e.g., the graphic overlay manager 134 at the interactive service provider 120).

In some embodiments, the decision regarding whether to act upon the event opportunity may be taken based on a defined criteria. The defined criteria may include, but not limited to a retrieved set of user-preferences, a defined goal in a flight (defined by the video service provider 110), a measured or known user attention span, time constraints, inventory constraints, user-defined constraints, or a combination thereof. For example, the defined goal may include, but is not limited to a defined value of cost per thousand impressions (CPM), a click through rate (CTR), cost per sale (CPS), and a reach target. Similarly, the time constraints may include, but are not limited to a limited duration for which the user may stay online and stream the programming media content, a limit to a total number of candidate time intervals (event opportunities) in the programming media content, and an average attention span of the user.

The limit on user availability for the duration of programming media content may also set a limit on the number of candidate time intervals in a limited duration of the programming media content. The inventory constraints may include, but are not limited to an availability of overlay graphics that can be presented in the identified candidate time interval and a limit on a number of overlay graphics that matches up to the parameters in the request information. The user-defined constraints may include but are not limited to, a constraint on number of advertisements, a cap on number of times a product advertised may be rendered purchasable, a content filter for a specific viewer (for example, filter content that is not intended for young kids and teenagers (below the age of 18 years).

The client device 138 may be further configured to transmit a request to the overlay ad server 150, to transmit overlay graphics for the event opportunities for which the permissions to present overlay graphics (and deliver services) have been granted by the video service provider 110 or the graphic overlay manager 134. The overlay ad server 150 may be configured to receive the request from the client device 138 and in response to the received request, the overlay ad server 150 may transmit overlay graphics (along with graphic metadata) to the client device 138. More specifically, the overlay ad server 150 may receive asset ID (or trigger ID and event ID) for each event opportunity for which permission to overlay graphics and render different services has been granted. The overlay ad server 150 may be further configured to search for overlay graphics that match the asset ID (or trigger ID and event ID). In some cases, the overlay ad server 150 may also specify, in the graphic metadata, different types of services that can be delivered through each overlay graphic, via the client device 138.

On receipt of the overlay graphics, the client device 138 may be configured to render a plurality of overlay graphics on the media content (programming and non-programming) for a plurality of candidate time intervals (corresponding to a plurality of event opportunities) within the playback duration of the media content. The plurality of overlay graphics may be rendered as a transparent layer placed on top (or sandwiched between different graphical layers) of the media content. An overlay graphic rendered on the media content may act as a trigger input, or more specifically, a user-selectable option when activated at the client device 138. However, in some cases, initially, the overlay graphic rendered on the media content may be presented in a deactivated state. The overlay graphic may be a specific bug (i.e., a digital on-screen graphic) for a product that is promoted in a non-programming asset played at the client device 138, a graphical button, a product mark, and the like.

In some embodiments, the overlay graphics may be rendered on an interactive platform (or a viewable region of an application interface) of a client application in the secondary device 140. A notification may be server onto the secondary device 140 and upon user selection of the served notification, the client application may pop up on the display screen of the secondary device 140 and an overlay graphic (e.g., an on-screen user-selectable button) may be displayed in the client application interface. The decision to present an overlay graphic on the secondary device 140 may be taken by at least one of the interactive service provider 120, the video service provider 110, or the client device 138, based on usage statistics of the secondary device 140 and user accessibility to engage with the overlay graphic (if activated) on the secondary device 140.

The client device 138 may be further configured to search (or identify) for available set of input devices (wired or wireless) that may be present in the vicinity of the client device 138 or the secondary device 140 (which may be paired/unpaired with the client device 138. Example of an input device may include, but not limited to, TV remote, smartphone, a haptic switch, a gesture sensor, a motion sensor, a smart speaker, a paired (or connectable) microphone, or a specialized physical input device (e.g., a button that is common for every product, or a product-specific button). Thereafter, the client device 138 may be further configured to pair up with one or more of the set of input devices available in vicinity of the client device 138 or the secondary device 140 paired with the client device 138. The client device 138 may pair up with one or more of the set of input devices, via a Bluetooth network, a Wi-Fi network, an internet-based network, a wired local network, a wireless ad hoc network, and the like.

In some cases, instead of pairing up, an input device (e.g., a smart speaker) may listen (or recognize) to audio (or visual) markers/beacons/signals during the playback of the media content, and therefore, may not require pairing connections with the client device 138. Alternatively, some virtual voice assistants may only be loosely paired (selectively paired) with the client device 138 based on a proximity and an ability to hear the audio from the client device 138. It may be the interactive service provider (or a partner) that may configure the client device 138 to detect triggers. The user may have to accept or approve the configuration through the secondary device 140 (e.g., a smartphone) that is different from the client device 138 (e.g., a smart TV) receiving the prepared media content from the video service provider 110. Alternatively stated, a voice assistant application on the secondary device 140 (in vicinity of the client device 138) may also install an voice assistant service that may offer relevant offers from the interactive service provider 120 (or other partners) while the user is engaged in watching the media content played on the client device 138. Also, in some cases, the input device may be loosely paired or even unpaired with the client device 138, and therefore, the input device may listen for a trigger identifier in the audio portion of the media content automatically based on instructions from the interactive service provider 120.

A check may be further executed at the client device 138 to decide whether to activate one or more input devices (paired/unpaired with the client device 138) from the set of input devices, the overlay graphics rendered on the media content or the overlay graphics rendered at the secondary client device 140. The decision for activation may be taken based on the check executed on a defined criteria that is associated with stored records of previous service requests for event opportunities already on which services were delivered in past. The defined criteria may include at least one of a user-defined constraint, an inventory constraint, and a specified threshold count of trigger responses for a product offering or a service offering promoted by the non-programming media content. In some cases, the decisions may be taken to minimize an effect of disturbance or diversions in viewing experience for a user who may wish to watch the programming media content without any diversions caused by promotional content (or user selectable options).

The client device 138 may be further configured to activate, via the trigger client SDK 146, at least one of one or more input devices in vicinity of the client device 138 or the rendered plurality of overlay graphics on the media content or at the secondary device 140. At least one of the one or more input devices may be paired with the client device 138 or the secondary device 140. In some cases, the trigger client SDK 146 may also be utilized to activate the one or more input devices (paired/unpaired with the client device 138). The activation may be done based on the decisions taken (which in turn may be based on the defined criteria) by the interactive service provider 120. The activation may be followed by a notification (e.g., a notification light that blinks on the TV remote when the TV remote is activated to send a trigger response, a vibration pattern, a tone with a specific pattern, an on-screen visual notification, etc.) to alert the user associated with the client device 138 regarding activation of a paired/unpaired input device, or a rendered overlay graphic. The overlay graphic that is rendered on the display 142 may specify types of services that the user can avail if selected through the activated input device(s) or overlay graphics. The types of services may include, but not limited to one of a direct payment, a direct transaction, or a direct notification for a product offering or a service offering, and a direct update of a selected product offering or a service offering in a shopping cart, a personalized list generation, or sharing on a social platform.

In some cases, the client device 138 may be configured to receive one or more trigger responses over an activated overlay graphic on the media content (during playback duration of the media content), via an activated input device or an overlay trigger input (also referred to as an activated overlay graphic). The one or more trigger responses may correspond to one or more user interactions that are received based on use inputs. Example of user inputs include, but are not limited to a touch input, a gesture input, a haptic feedback input, or a voice command input. One or more notifications may be received on at least one of the client device 138 or the secondary device 140 paired with the client device 138, in response to the received one or more trigger responses. Also, more notifications may be delivered when an overlay graphic or an input device is not enabled based on the defined criteria, or when service is selected for delivery, and the like.

In response to a receipt of the one or more trigger responses, the client device 138 may be further configured to transmit a request to the fulfillment server 152 to deliver services. Examples of the different services that may be delivered through the client device 138 or the secondary device 140, may include, but are not limited to an OTT service through internet, a service that can be delivered through broadcast networks on different client devices, such as ATSC smart TVs (e.g., ATSC 3-enabled TV), presentable (visual, aural, etc.) services, consumable services, online services, purchase service, or other access independent services or dependent services. The fulfillment server 152 may be configured to receive the request from the client device 138 for delivery of services (or service offerings) that were promoted by different assets (e.g., video ads or graphical overlays) in the media content at the client device 138. The fulfillment server 152 may deliver the services in response to the received one or more trigger responses on the event opportunities in the programming media content.

The client device 138 may be further configured to display an interactive platform (e.g., an interactive product display and payment page etc.) on the client device 138, to enable delivery of the services in response to the received one or more trigger responses. The delivery of the services may be enabled at the client device 138 in communication with the fulfillment server 152 that fulfills the delivery of the services to increase a user engagement to select services.

For example, the fulfillment server 152 may render a shopping cart with a product offering (promoted in the non-programming media content at an event opportunity) selected based on a trigger response. In some cases, instead of a shopping cart, a selected product offering may be directly ordered by the fulfillment server 152 based on pre-specified payment information and address information in the user database.

In an exemplary embodiment, a virtual voice assistant may be enabled on the input device or at least one of the client device 138 and the secondary device 140. Also, the virtual voice assistant may be accessible through a voice command device (e.g., a smart speaker). The input device may be configured to actively wait and listen for a trigger identifier in the audio portion of the media content. The trigger identifier in the audio portion may be an inaudible beacon (ultrasonic or infrasonic frequency range), an audible beacon, and the like. The voice command device or the virtual assistant may detect beacons within the playback duration of the programming media content and facilitate a conversation with the user to receive a trigger response from the user. The trigger response may be received through a user's speech input. The voice command device or the virtual assistant may communicate the trigger response to the client device 138, which may further communicate the trigger response to the fulfillment server 152. Thereafter, the fulfillment sever 152 may be further configured to deliver services (offered with the playback of the media content) based on the received trigger response in the conversation between the user and the voice command device or the virtual assistant.

In certain embodiments, all the operations executed by the client device 138 except the playback of media content onto the display 142 may be executed by a proxy server (not shown in FIG. 1) on behalf of the client device 138. Such execution may not affect the functional performance of the client device 138 or expected results from different operations described in FIG. 1, without a deviation from scope of the disclosure.

Figure 2:
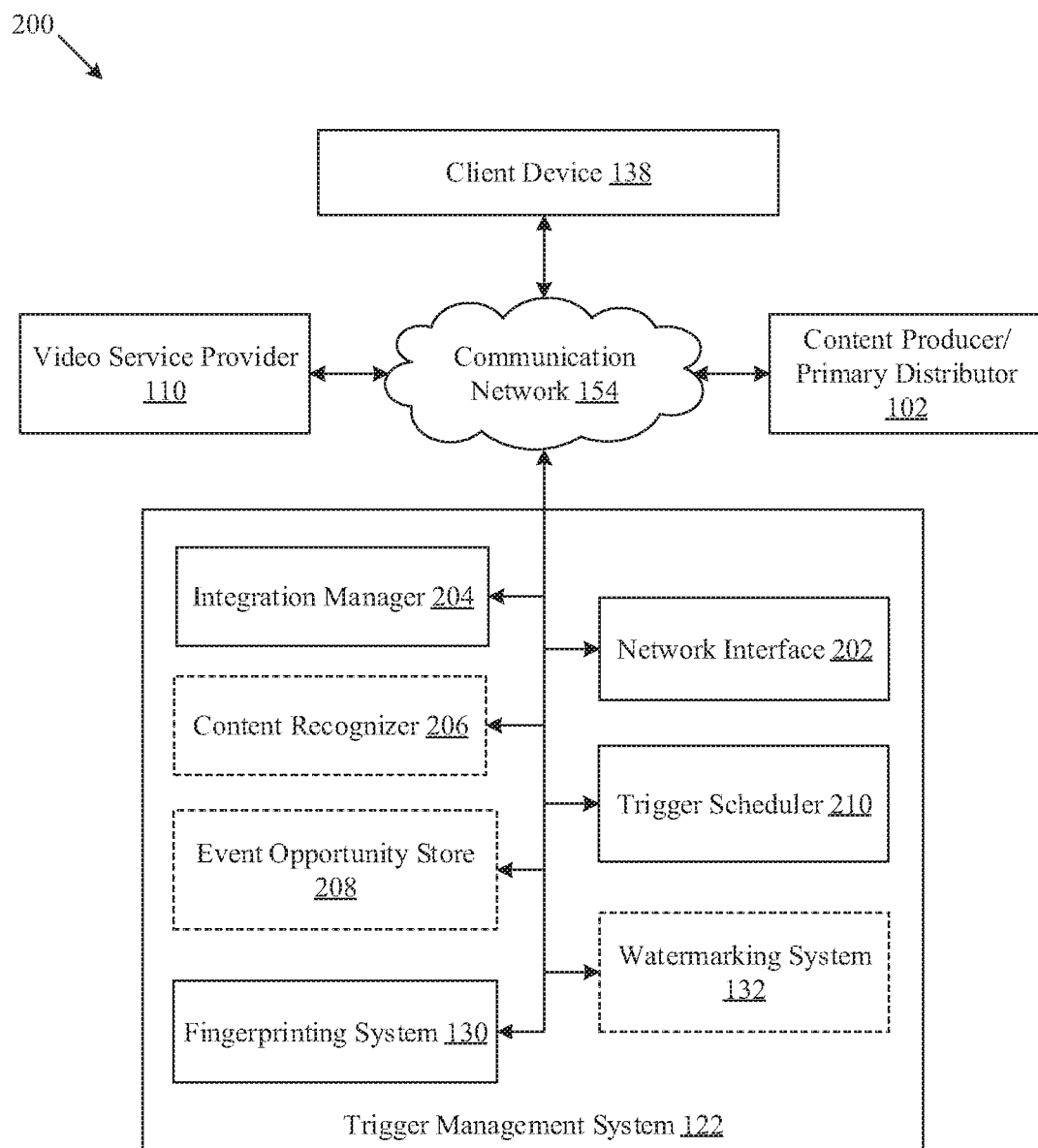
FIG. 2 is a block diagram that illustrates an exemplary trigger management system that handles insertion and activation of trigger identifiers in media content received from video service providers, in accordance with an exemplary embodiment of the disclosure.

FIG. 2 is a block diagram that illustrates an exemplary trigger management system that handles insertion and activation of trigger identifiers in media content received from different video service providers, in accordance with an exemplary embodiment of the disclosure. FIG. 2 is explained in conjunction with elements from FIG. 1. With reference to FIG. 2, there is shown a block diagram 200 of the trigger management system 122. The trigger management system 122 may include an integration manager 204, a content recognizer 206, an event opportunity store 208, and a trigger scheduler 210. The trigger management system 122 may also include the fingerprinting system 130 and the watermarking system 132, as shown in FIG. 1.

The integration manager 204 may comprise suitable logic, circuitry, and interfaces that may be configured to authenticate API requests or SDK integration requests from different video service providers (e.g., the video service provider 110) or different client devices (e.g., the client device 138). Such authentication may be done based on sharing licenses, certificates, agreements, or public/private key for access to various APIs, the trigger insert SDK 118, or the trigger client SDK 146.

The content recognizer 206 may comprise suitable logic, circuitry, and interfaces that may be configured to execute operations associated with content recognition of programming or non-programming media content received from different video service providers (e.g., the video service provider 110). The content recognizer 206 may operate as a statistical signal processing engine that may execute operations for the recognition of assets (e.g., segments that offer product placement opportunities (e.g., coffee scene), video advertisements, overlay graphics (such as, bugs, logos, $\frac{1}{3}^{rd}$ graphics, banners, tickers, etc.) in the media content. The content recognizer 206 may further identify different attributes (e.g., audio or video fingerprints) of the programming and/or non-programming media assets (as part of non-programming media content) through implementation of a technique, such as acoustic fingerprinting, digital watermarking, and digital video fingerprinting.

In certain implementations, supervised or unsupervised machine learning, deep learning, neural network, or artificially intelligence based techniques may be implemented to facilitate precise determination of different attributes of the media items in the media content. In certain embodiments, the content recognizer 206 may be implemented as a specialized circuitry or an application at the trigger management system 122. For such implementations, the content recognizer 206 may utilize computational resources of a graphical processing unit (GPU) at the trigger management system 122.

The event opportunity store 208 may comprise suitable logic, circuitry, and interfaces that may be configured to store a scheduled list of event opportunities (represented by candidate time intervals or on-screen regions in candidate time intervals) in the media content (programming or non-programming). The scheduled list of event opportunities may be received from the video service provider 110 or may be generated by the trigger management system 122 based on an analysis of the media content received from the video service provider 110.

The trigger scheduler 210 may comprise suitable logic, circuitry, and interfaces that may be configured to receive a request from the video service provider 110 and generate a plurality of trigger identifiers (e.g., a trigger identifier may include "255 bytes" of information that includes at least an asset or event identifier (ID)). The trigger scheduler 210 may also generate event information for each generated trigger identifier. The event information may include, but is not limited to asset ID of a media asset, an overlay position, a graphic asset that may be overlaid, an overlay duration, or other presentation attributes. The trigger scheduler 210 may be further configured to transmit the generated plurality of trigger identifiers in response to the received request from the video service provider 110 and further insert the plurality of trigger identifiers in the media content at different event opportunities, through the API-based integration with the video service provider 110 via the trigger insert SDK 118. The trigger scheduler 210 may be further configured to store the generated event information associated with each trigger identifier in the watermark/fingerprint/trigger registry 136.

FIGS. 3A and 3B, collectively depict a first exemplary scenario that illustrates a client-side presentation of overlay graphics and receipt of trigger response over presented overlay graphics, via an input device, in accordance with an embodiment of the disclosure. FIGS. 3A and 3B are explained in conjunction with elements from FIG. 1 and FIG. 2. With reference to FIGS. 3A and 3B, there is shown a first exemplary scenario that shows two different states at different time instants (i.e., a first state 300A and a second state 300B) in which a purchase service is rendered based on user-options activated while programming media content is received and played onto the display 142.

In the first state 300A of FIG. 3A, a user 302 may be engaged in watching programming media content (e.g., a favorite TV show) on a television channel (represented by a channel logo 304). An input device 306 that is paired with the client device 138 may be held in the hand of the user 302. While an advertisement media 308 is played on the channel (represented by the channel logo 304), the client device 138 may present an overlay graphic 310 (represented as a "buy option" in the FIG. 3A) and activate the input device 306 to purchase a product offering 312 promoted in the advertisement media 308 presented onto the display 142.

In second state 300B of FIG. 3B that occurs after the first state 300A of FIG. 3A, upon activation of the input device 306, a notification light 306A on the input device 306 may blink in accordance with a specific pattern. Such blinking may alert the user 302 to act within a duration for which the input device 306 is activated. In an event where the button on the input device 306 is pressed (or selected), the fulfillment server 152 may receive a trigger response (which may include details of the selected product offering 312 and user details (e.g., payment details, delivery address, etc.)). Upon receipt of the trigger response, the fulfillment server 152 may generate an interactive view (i.e., an interactive platform or page) that may be displayed onto the display 142. The interactive view may show the selected product offering 312 getting transferred to shopping cart 314 and a confirmation message may pop up on the display 142. Upon confirmation, the fulfillment server 152 may be configured to complete a transaction and the selected product offering 312 may be ordered for delivery.

Figure 4:
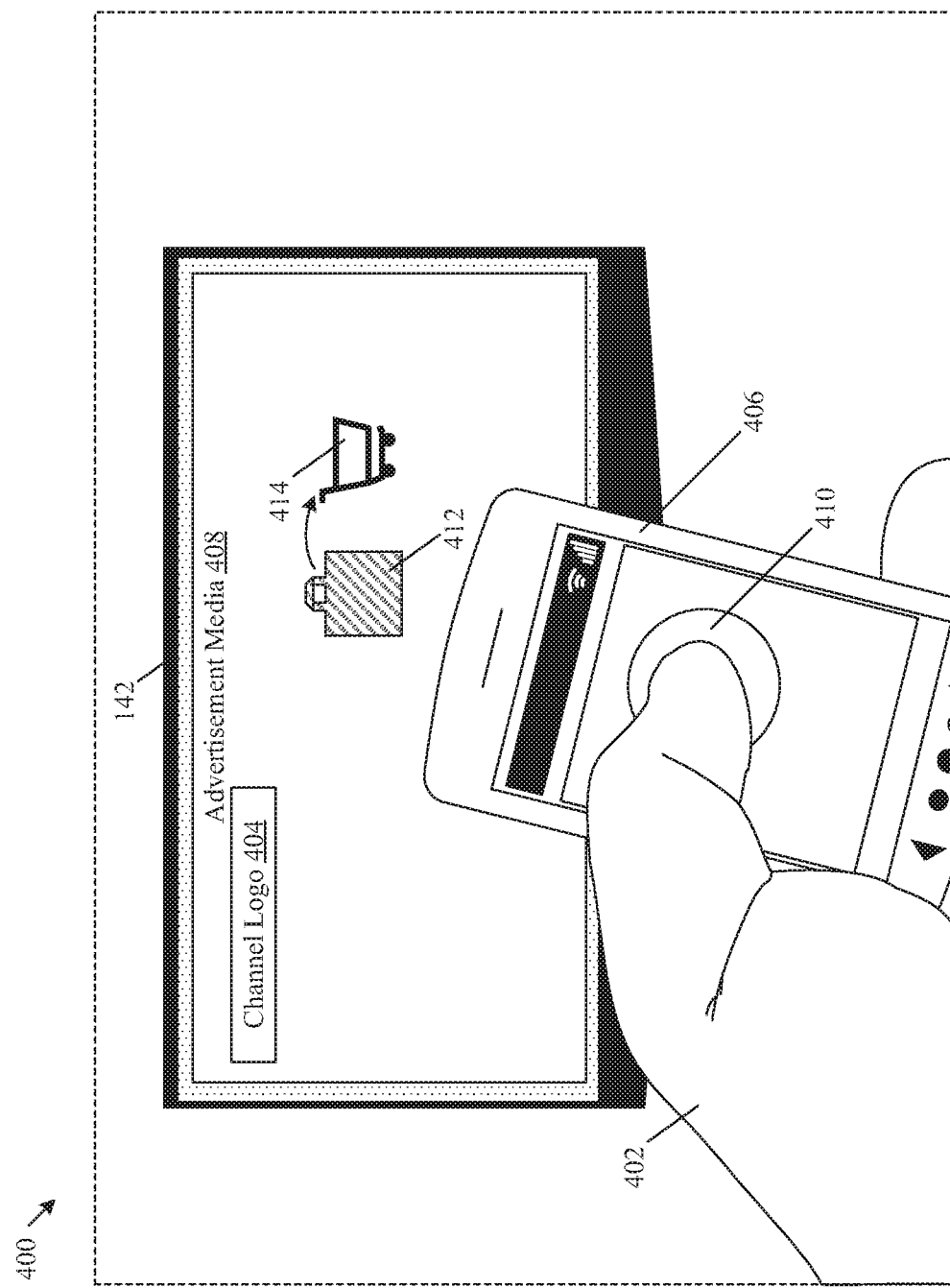
FIG. 4 depicts a second exemplary scenario that illustrates client-side presentation of overlay graphics and receipt of trigger response over presented overlay graphics, via a trigger input rendered on a secondary device paired with client device, in accordance with an embodiment of the disclosure.

FIG. 4 depicts a second exemplary scenario that illustrates client-side presentation of overlay graphics and receipt of trigger response over presented overlay graphics, via a trigger input rendered on a secondary device paired with client device, in accordance with an embodiment of the disclosure. FIG. 4 is explained in conjunction with elements from FIGS. 1, 2, 3A, and 3B. With reference to FIG. 4, there is shown a second exemplary scenario that shows a state 400 in which a purchase service is rendered based on user-options activated while non-programming media content is streamed and played on the display 142.

In the state 400, a user 402 may be engaged in watching programming media content (e.g., favorite TV show) on a television channel (represented by a channel logo 404). A smartphone 406 (i.e., the secondary device 140) that is paired with the client device 138 may be held in the hand of the user 402. While the non-programming media content, such as an advertisement media 408, is played on the channel (represented by the channel logo 404), an overlay graphic 410 (which is represented by a "graphical button") is rendered onto the display of the smartphone 406 and the smartphone 406 is activated to purchase a product offering 412 promoted in the advertisement media 408 and presented on the display 142.

Upon activation, the smartphone 406 may respond by generating a notification (e.g., a vibration, a light blink, screen blink, a tone, etc.). Such notifications may alert the user 402 to act within a specified duration for which the smartphone 406 is activated. In an event where the overlay graphic 410 on the smartphone 406 is pressed (or selected), the fulfillment server 152 may receive a trigger response (which may include details of the selected product offering 412 and user details (e.g., payment details, delivery address, etc.)). Upon receipt of the trigger response, the fulfillment server 152 may generate an interactive view (i.e., an interactive platform or interactive page) that may be displayed onto the display 142. The interactive view may show the selected product offering 412 getting transferred to shopping cart 414 and a confirmation message may pop up on the display 142. Upon confirmation, the fulfillment server 152 may be configured to complete a transaction and the selected product offering 412 may be ordered for delivery.

Figure 5:
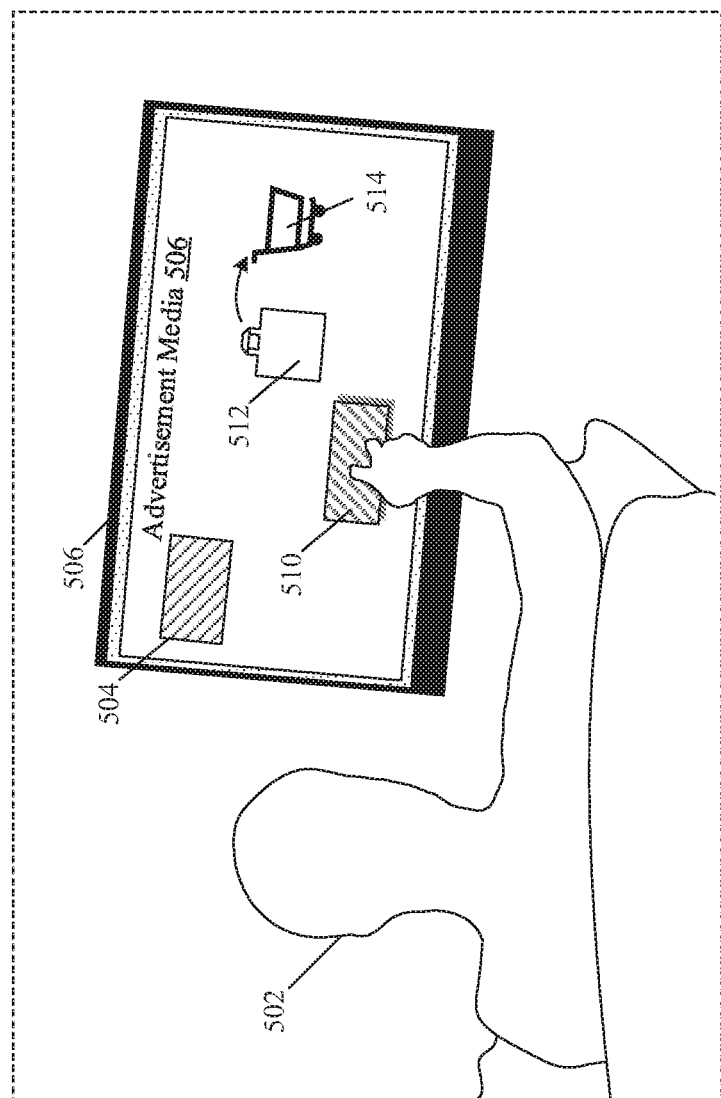
FIG. 5 depicts a third exemplary scenario that illustrates client-side presentation of overlay graphics and receipt of trigger response over presented overlay graphics based on a direct user selection of presented overlay graphics, in accordance with an embodiment of the disclosure.

FIG. 5 depicts a third exemplary scenario that illustrates client-side presentation of overlay graphics and receipt of trigger response over presented overlay graphics based on a direct user selection of presented overlay graphics, in accordance with an embodiment of the disclosure. FIG. 5 is explained in conjunction with elements from FIGS. 1, 2, 3A, 3B, and 4. With reference to FIG. 5, there is shown a third exemplary scenario that shows a state 500 in which a purchase service is rendered based on user-options activated while non-programming media content is streamed and played on a touch screen device.

In the state 500, a user 502 may be engaged in watching programming media content (e.g., favorite TV show) on a television channel (represented by a channel logo 504). A tablet 506 (i.e., an integration of the client device 138 and the display 142) may be held in the hand of the user 402. While an advertisement media 508 is played on the channel (represented by the channel logo 504) at a certain point of the programming media content, an overlay graphic 510 (which is represented by a "graphical button") may be rendered onto the touch display of the tablet 506. Thereafter, the tablet 506 may be activated to purchase a product offering 512 promoted in the advertisement media 508.

Upon activation, the tablet 506 may respond by generating a notification (e.g., a vibration, a light blink, screen blink, a tone, etc.). Such notifications may alert the user 502 to act within a specified duration for which the tablet 506 is activated. In an event where the overlay graphic 510 is selected by a touch input on the touch screen of the tablet 506, the fulfillment server 152 may receive a trigger response (which may include details of the selected product offering 512 and user details (e.g., payment details, delivery address, etc.)). Upon receipt of the trigger response, the fulfillment server 152 may generate an interactive view (i.e., an interactive platform, page, or UI) that may be displayed onto the tablet 506. The page may show the selected product offering 512 getting transferred to shopping cart 514 and a confirmation message may pop up on the tablet 506. Upon confirmation, the fulfillment server 152 may be configured to complete a transaction and the selected product offering 512 may be ordered for delivery.

Figure 6:
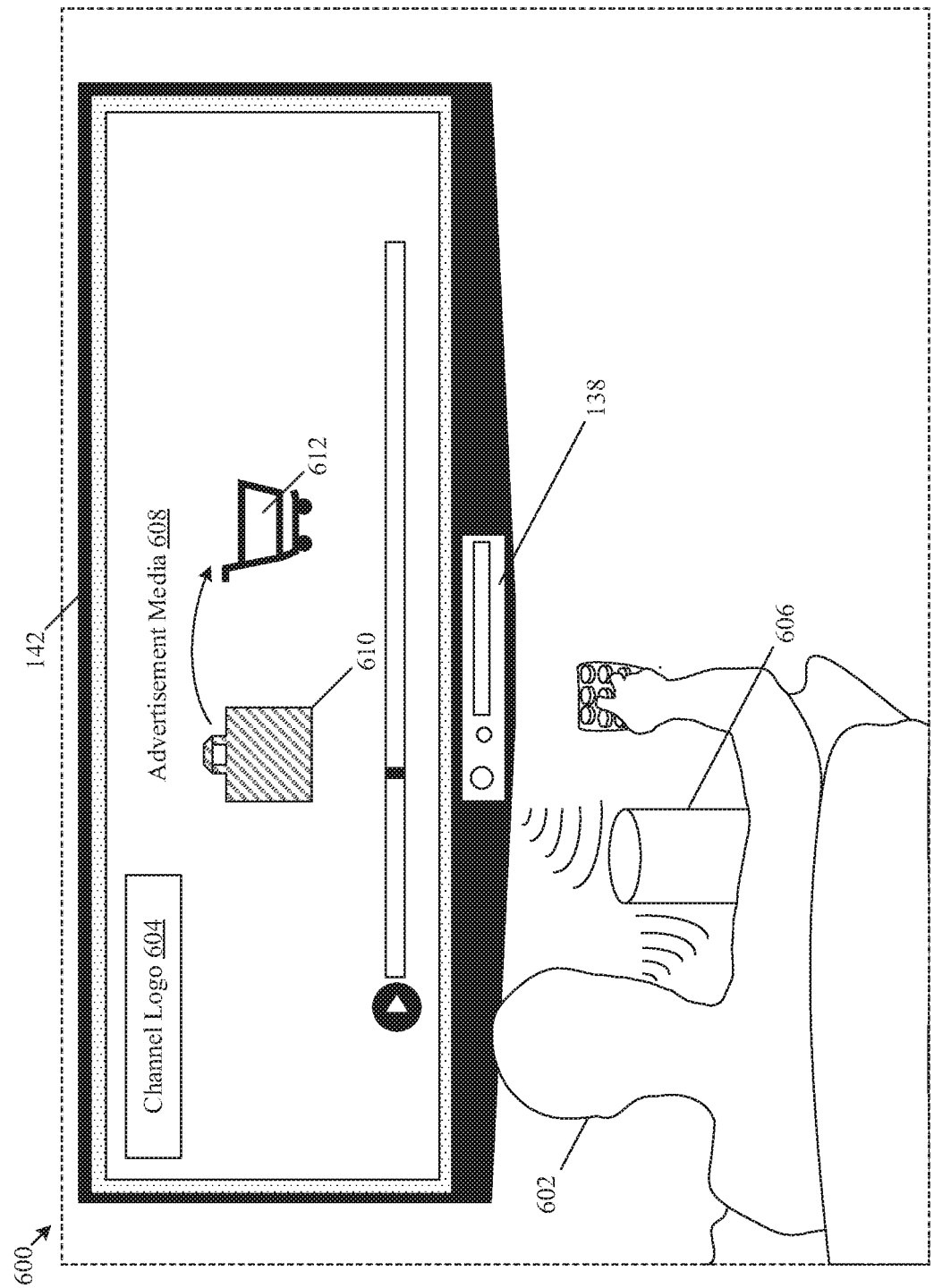
FIG. 6 depicts a fourth exemplary scenario that illustrates client-side presentation of overlay graphics and receipt of voice responses over presented overlay graphics, handles by a smart conversational agent, in accordance with an embodiment of the disclosure.
Figure 7A:
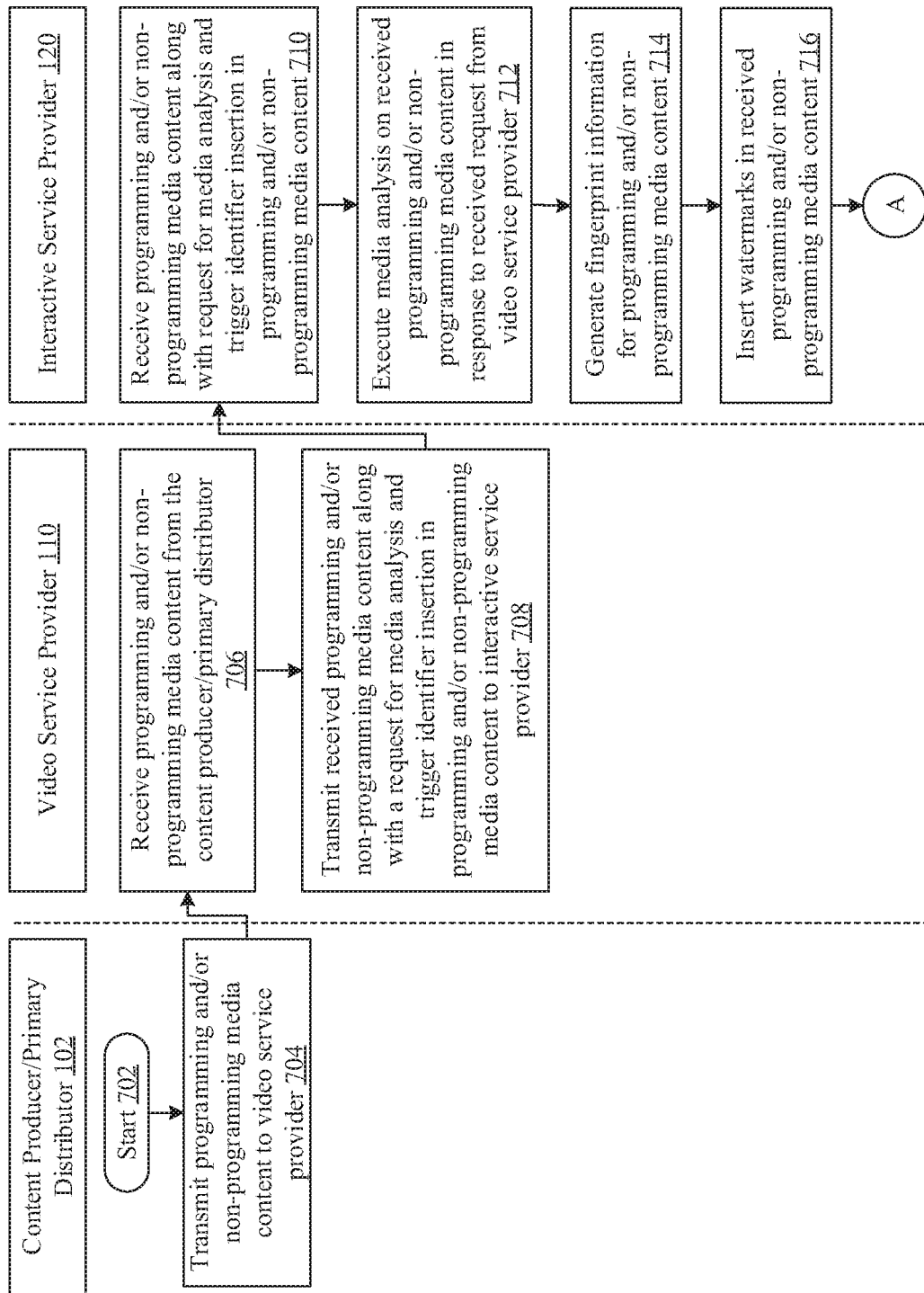
FIGS. 7A to 7E are flowcharts that collectively illustrate a method for delivery of different services through different client devices, in accordance with an embodiment of the disclosure.
Figure 7B:
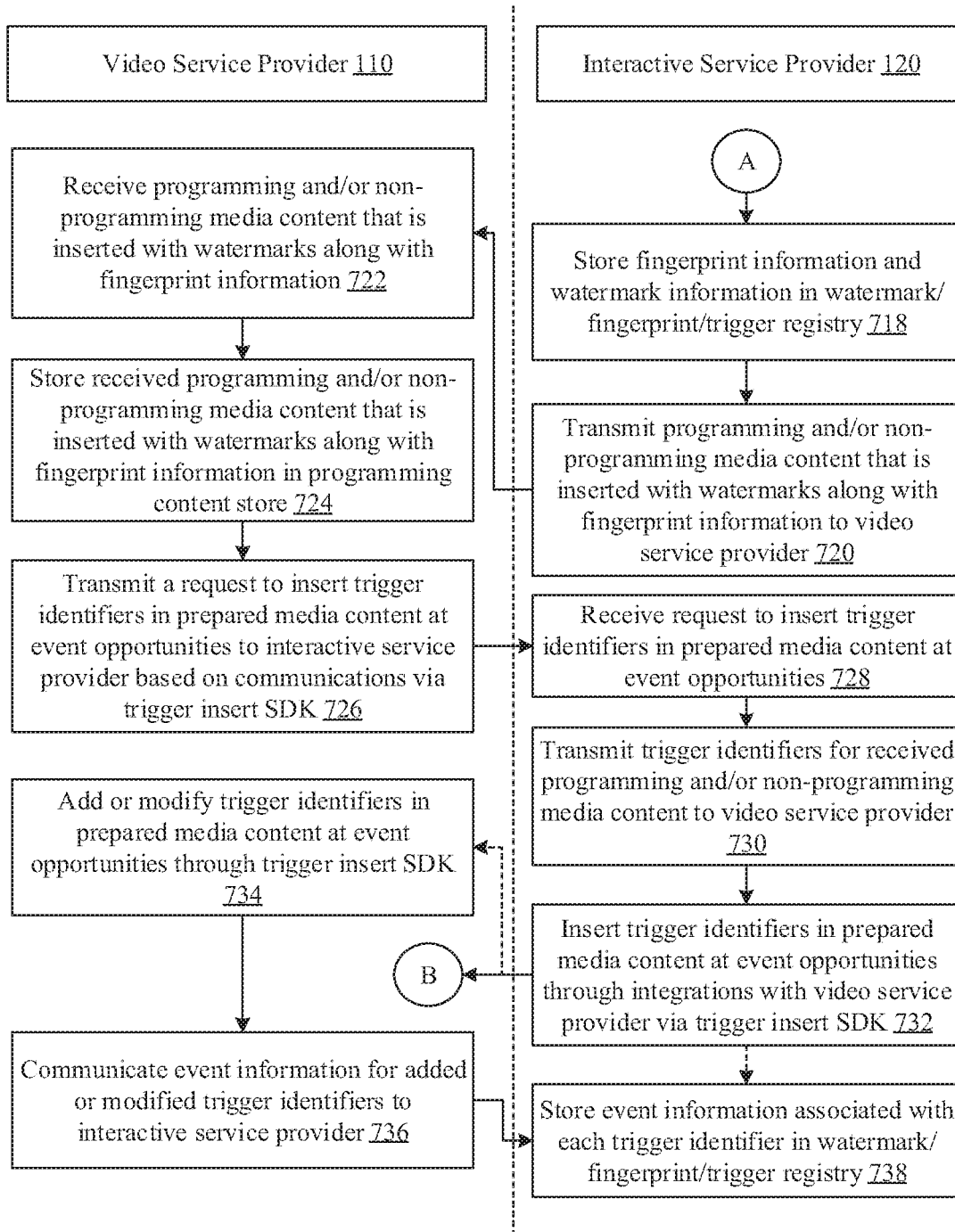
Figure 7C:
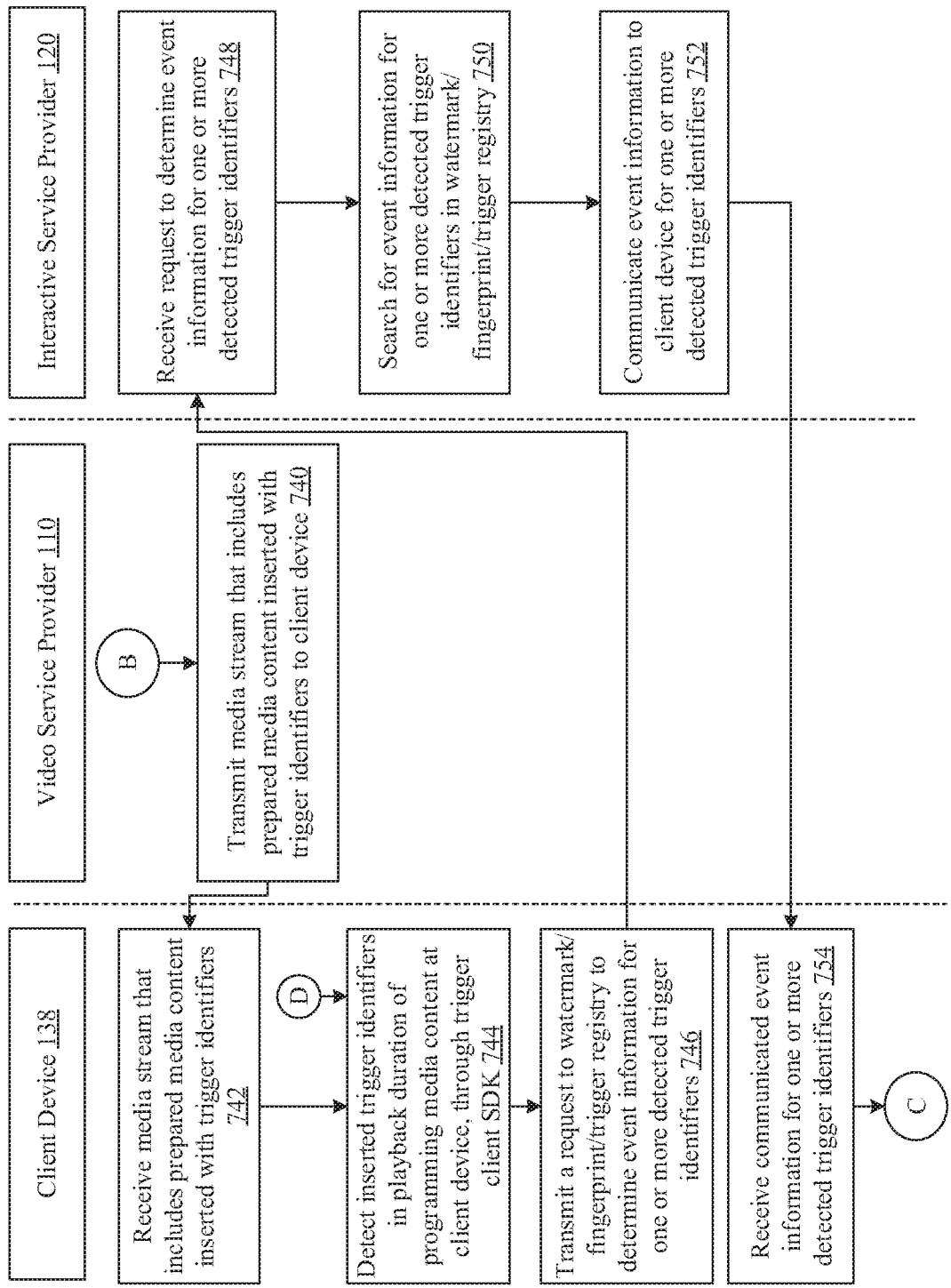
Figure 7D:
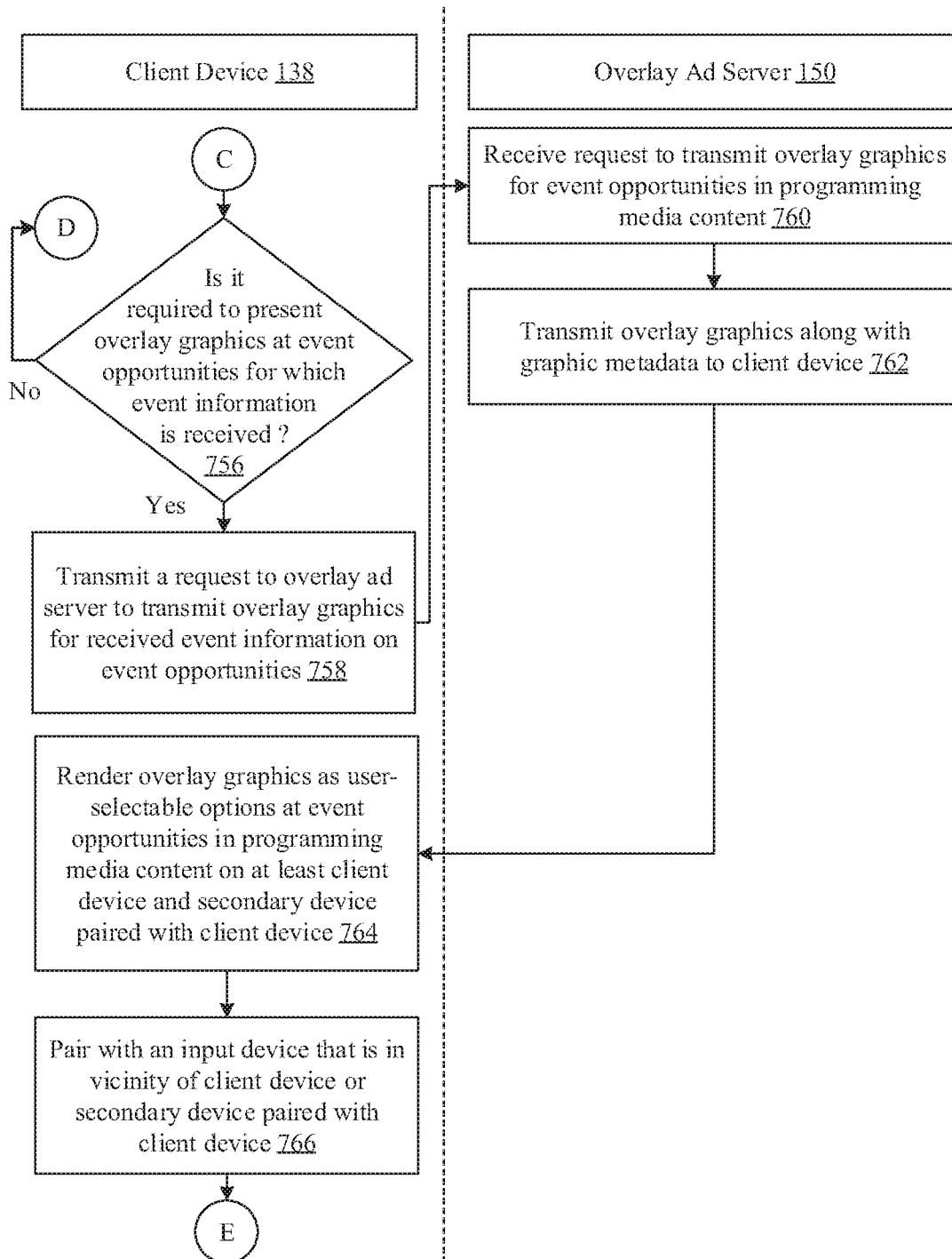
Figure 7E:
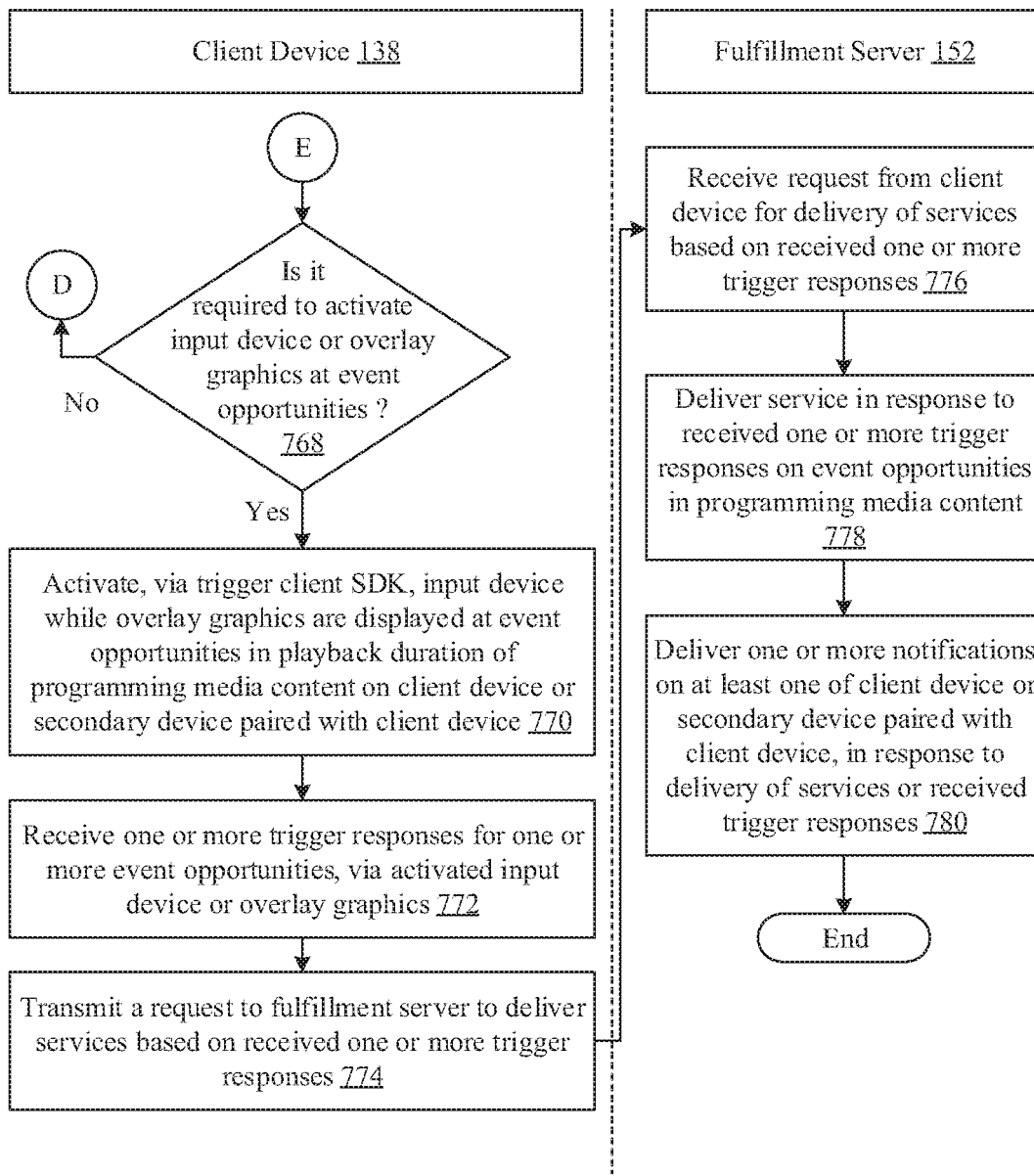

FIG. 6 depicts a fourth exemplary scenario that illustrates client-side presentation of overlay graphics and receipt of voice responses over presented overlay graphics, handled by a smart conversational agent, in accordance with an embodiment of the disclosure. FIG. 6 is explained in conjunction with elements from FIGS. 1, 2, 3A, 3B, 4, and 5. With reference to FIG. 6, there is shown a fourth exemplary scenario 600 in which a purchase service is rendered based on activation of a smart conversational agent while programming media content is streamed and played onto the display 142.

Initially, a user 602 may be engaged in watching programming media content (e.g., favorite TV show) on a television channel (represented by a channel logo 604). A smart speaker 606 that includes (or is accessible to) a virtual voice assistant may be paired with the client device 138. The smart speaker 606 may be configured to actively wait and listen for a trigger identifier (e.g., an inaudible beacon) in the audio portion of the programming media content. Thereafter, at a certain time point based on the trigger identifier, an advertisement media 608 for a product offering 610 is played on the channel (represented by the channel logo 604). The inaudible beacon (i.e., a trigger identifier) present in the audio portion of the advertisement media 608 may be received by the smart speaker 606, via a set of microphones in the smart speaker 606, during playback of the audio portion of the advertisement media 608. Upon receipt of the inaudible beacon, the virtual voice assistant in the smart speaker 606 may detect the inaudible beacon during the playback duration of the advertisement media 608 and facilitate a conversation with the user 602 to receive a trigger response from the user 602.

The virtual conversational agent may start the conversation by describing about the product offering 610 presented onto the display 142. Such conversation may alert the user 602 to act within a duration for which the smart speaker 606 is activated. In an event where a voice response is said by the user 602 to purchase the product offering 610 in the conversation, the virtual conversational agent may confirm an order for the product offering 610 and the client device 138 may display a shopping cart 612 where the product offering 610 is added. The client device 138 may further transfer the voice response from the user 602 as a trigger response to the fulfillment server 152. The fulfillment server 152 may receive a trigger response (which may include details of the selected product offering 610 and user details (e.g., payment details, delivery address, etc.)). Upon receipt of the trigger response, the fulfillment server 152 may be configured to complete a transaction and the selected product offering 610 may be ordered for delivery.

FIGS. 7A to 7E are flowcharts that collectively illustrate a method for delivery of different services through different client devices, in accordance with an embodiment of the disclosure. FIGS. 7A to 7E are explained in conjunction with elements from FIGS. 1, 2, 3A, 3B, 4, 5, and 6. With reference to FIGS. 7A to 7E, there is shown a flowchart. The flowchart may depict a method that starts from 702 and proceeds to 704.

At 704, programming and/or non-programming media content may be transmitted to the video service provider 110. The content producer/primary distributor 102 may be configured to transmit the programming and/or non-programming media content to the video service provider 110.

At 706, programming and/or non-programming media content may be received from the content producer/primary distributor 102. The video service provider 110 may be configured to receive the programming and/or non-programming media content from the content producer/primary distributor 102.

At 708, received programming and/or non-programming media content may be transmitted along with a request for media analysis and trigger identifier insertion in programming and/or non-programming media content to the interactive service provider 120. The video service provider 110 may be configured to transmit the received programming and/or non-programming media content along with a request for media analysis and trigger identifier insertion in the programming and/or non-programming media content to the interactive service provider 120.

At 710, programming and/or non-programming media content along with the request for media analysis and trigger identifier insertion in the programming and/or non-programming media content may be received. The interactive service provider 120 may be configured to receive the programming and/or non-programming media content along with the request for media analysis and trigger identifier insertion in the programming and/or non-programming media content.

At 712, media analysis may be executed on received programming and/or non-programming media content in response to received request from the video service provider 110. The media analysis system 126 (of the interactive service provider 120) may be configured to execute a media analysis on received programming and/or non-programming media content in response to received request from the video service provider 110.

At 714, fingerprint information may be generated for the received programming and/or non-programming media content. The fingerprinting system 130 (of the interactive service provider 120) may be configured to generate fingerprint information for the received programming and/or non-programming media content.

At 716, watermarks may be inserted in the received programming and/or non-programming media content. The watermarking system 132 may be configured to insert the watermarks in the received programming and/or non-programming media content.

At 718, generated fingerprint information and watermark information may be stored in the watermark/fingerprint/trigger registry 136. The trigger management system 122 (of the interactive service provider 120) may be configured to store the generated fingerprint information and watermark information in the watermark/fingerprint/trigger registry 136.

At 720, programming and/or non-programming media content that is inserted with watermarks is transmitted along with fingerprint information to the video service provider 110. The interactive service provider 120 may be configured to transmit the programming and/or non-programming media content that is inserted with watermarks along with fingerprint information to the video service provider 110.

At 722, programming and/or non-programming media content that is inserted with watermarks may be received along with fingerprint information from the video service provider 110. The video service provider 110 may be configured to receive the programming and/or non-programming media content that is inserted with watermarks along with the fingerprint information from the video service provider 110.

At 724, received programming and/or non-programming media content that is inserted with watermarks along with fingerprint information may be stored in the programming content store 114. The video service provider 110 may be configured to store the received programming and/or non-programming media content that is inserted with watermarks along with fingerprint information in the programming content store 114.

At 726, a request may be transmitted to the interactive service provider 120 to insert trigger identifiers in prepared media content at event opportunities, based on communications via the trigger insert SDK 118. The video service provider 110 may be configured to transmit a request to the interactive service provider 120 to insert trigger identifiers in prepared media content at event opportunities, based on communications via the trigger insert SDK 118.

At 728, the request to insert trigger identifier in the prepared media content at different event opportunities may be received. The interactive service provider 120 may be configured to receive the request to insert trigger identifier in the prepared media content at different event opportunities.

At 730, trigger identifiers for the received programming and/or non-programming media content may be transmitted to the video service provider 110. The interactive service provider 120 may be configured to transmit the trigger identifiers for the received programming and/or non-programming media content to the video service provider 110.

At 732, trigger identifiers may be inserted in the prepared media content at different event opportunities through integrations with the video service provider 110, via the trigger insert SDK 118. The trigger scheduler 210 (of the trigger management system 122) may be configured to insert the trigger identifiers in the prepared media content at different event opportunities through integrations with the video service provider 110, via the trigger insert SDK 118.

At 734, trigger identifiers may be added or modified in the prepared media content at event opportunities through the trigger insert SDK 118. The video service provider 110 may be configured to add or modify trigger identifiers in the prepared media content at event opportunities through the trigger insert SDK 118.

At 736, event information for added or modified trigger identifiers may be communicated to the interactive service provider 120. The video service provider 110 may be configured to communicate the event information for added or modified trigger identifiers may be communicated to the interactive service provider 120.

At 738, the event information associated with each trigger identifier may be stored in the watermark/fingerprint/trigger registry 136. The trigger management system 122 may be configured to store the event information associated with each trigger identifier in the watermark/fingerprint/trigger registry 136.

At 740, a media stream that includes the prepared media content inserted with the trigger identifiers may be transmitted to the client device 138. The video service provider 110 may be configured to transmit the media stream that includes the prepared media content inserted with the trigger identifiers to the client device 138.

At 742, the media stream that includes the prepared media content inserted with the trigger identifiers may be received. The client device 138 may be configured to receive the media stream that includes the prepared media content inserted with the trigger identifiers from the video service provider 110.

At 744, inserted trigger identifiers may be detected in the playback duration of the programing media content at the client device 138, through the trigger client SDK 146. The client device 138 may be configured to request the content/watermark/trigger recognizer 144 to detect inserted trigger identifiers in the playback duration of the programing media content at the client device 138, through the trigger client SDK 146.

At 746, a request may be transmitted to the watermark/fingerprint/trigger registry 136 to determine event information for one or more detected trigger identifiers. The client device 138 may request the content/watermark/trigger recognizer 144 to request the watermark/fingerprint/trigger registry 136 to determine event information for one or more detected trigger identifiers.

At 748, the request to determine event information for one or more detected trigger identifiers may be received. The interactive service provider 120 may be configured to receive the request to determine event information for one or more detected trigger identifiers.

At 750, event information for one or more detected trigger identifiers may be searched in the watermark/fingerprint/trigger registry 136. The trigger management system 122 may be configured to search on event information for one or more detected trigger identifiers in the watermark/fingerprint/trigger registry 136.

At 752, the event information may be communicated to the client device 138 for one or more detected trigger identifiers. The trigger management system 122 may be configured to communicate the event information to the client device 138 for one or more detected trigger identifiers.

At 754, the communicated event information may be received for one or more detected trigger identifiers. The client device 138 may be configured to receive the communicated event information for one or more detected trigger identifiers.

At 756, it may be determined whether it is required to present overlay graphics at event opportunities for which event information is received. The client device 138 may be configured to determine whether it is required to present overlay graphics at event opportunities for which event information is received. In a case where a requirement exists, control passes to 758. Otherwise, control passes to 744.

At 758, a request may be transmitted to the overlay ad server 150 to transmit overlay graphics for received event information on event opportunities. The client device 138 may be configured to transmit the request to the overlay ad server 150 to transmit overlay graphics for received event information on event opportunities.

At 760, the request to transmit overlay graphics for received event information on event opportunities may be received. The overlay ad server 150 may be configured to receive the request to transmit overlay graphics for received event information on event opportunities.

At 762, the overlay graphics may be transmitted along with graphic metadata to the client device 138. The overlay ad server 150 may be configured to transmit the overlay graphics along with graphic metadata to the client device 138.

At 764, the overlay graphics may be rendered as user-selectable options on at least the client device 138 or the secondary device 140 paired with the client device 138, at event opportunities in the programming media content. The client device 138 may be configured to render the overlay graphics as user-selectable options on at least the client device 138 and the secondary device 140 paired with the client device 138, at event opportunities in the programming media content.

At 766, an input device that is in vicinity of the client device 138 or the secondary device 140 may be paired with the client device 138. The client device 138 may be configured to pair an input device that is in vicinity of the client device 138 or the secondary device 140 with the client device 138.

At 768, it may be determined whether it is required to activate the input device or the rendered overlay graphic at event opportunities. The client device 138 may be configured to determine whether it is required to activate the input device or the rendered overlay graphic at event opportunities. In a case where a requirement exists, control passes to 770. Otherwise, control passes to 744.

At 770, the input device may be activated, via the trigger client SDK 146, while the overlay graphics are displayed at event opportunities in the playback duration of the programming media content on the client device 138 or the secondary device 140 paired with the client device 138. The client device 138 may be configured to activate the input device, via the trigger client SDK 146, while the overlay graphics are displayed at event opportunities in the playback duration of the programming media content on the client device 138 or the secondary device 140 paired with the client device 138.

At 772, one or more trigger responses may be received for one or more event opportunities, via the activated input device or rendered overlay graphics. The client device 138 may be configured to receive the one or more trigger responses for one or more event opportunities, via the activated input device or rendered overlay graphics.

At 774, a request may be transmitted to the fulfillment server 152 to deliver services based on received one or more trigger responses. The client device 138 may be configured to transmit the request to the fulfillment server 152 to deliver services based on received one or more trigger responses.

At 776, the request may be received from the client device 138 for delivery of services based on received one or more trigger responses. The fulfillment server 152 may be configured to receive the request from the client device 138 for delivery of services based on received one or more trigger responses.

At 778, services may be delivered in response to the received one or more trigger responses on event opportunities in the programming media content. The fulfillment server 152 may be configured to deliver services in response to the received one or more trigger responses on event opportunities in the programming media content.

At 780, one or more notifications may be delivered on at least one of the client device 138 or the secondary device 140 paired with the client device 138, in response to the delivery of services or received trigger responses. The fulfillment server 152 may be configured to deliver one or more notifications on at least one of the client device 138 or the secondary device 140 paired with the client device 138, in response to the delivery of services or received trigger responses. Control passes to end.

Figure 8:
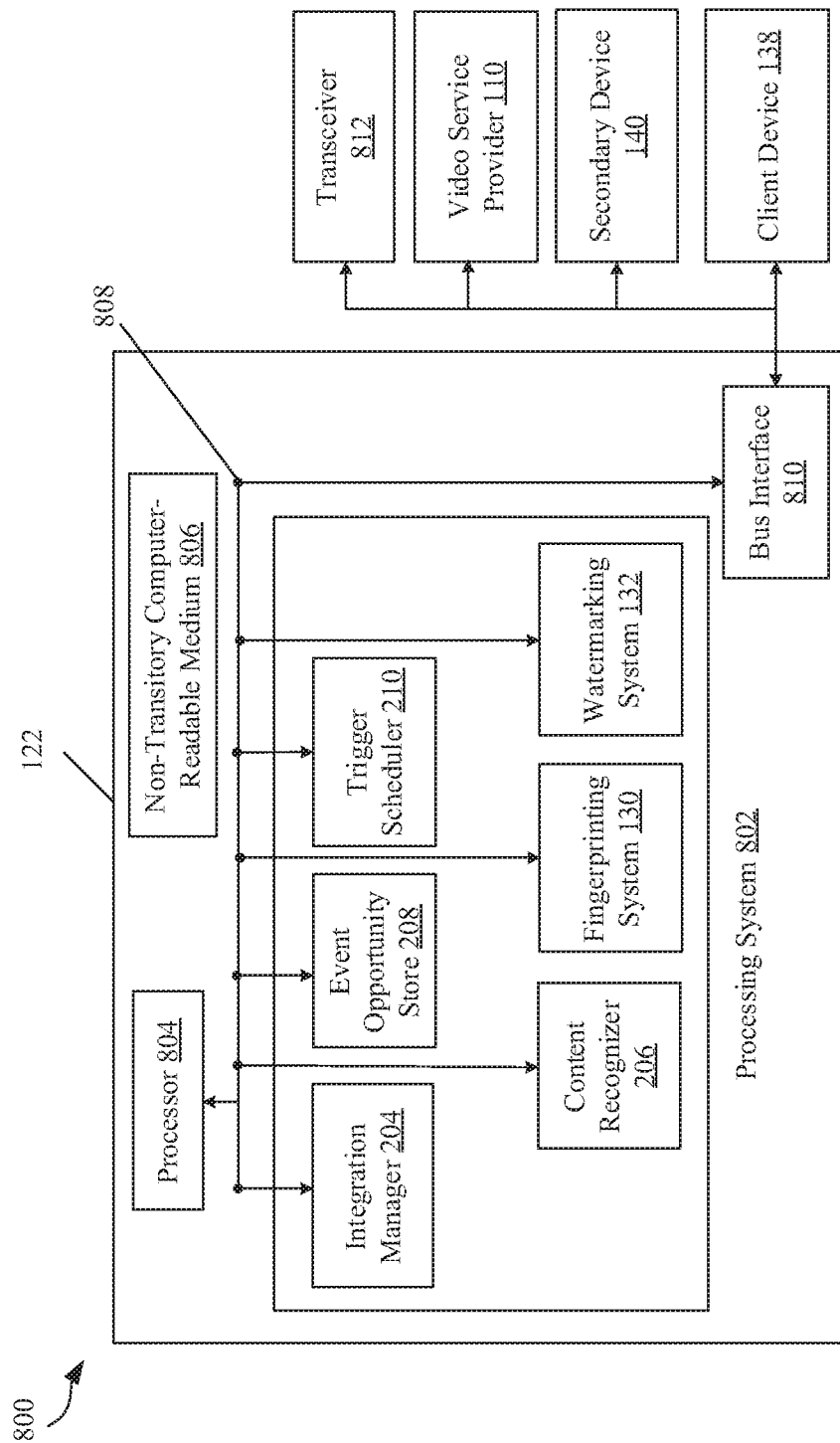
FIG. 8 is a conceptual diagram that illustrates an example of a hardware implementation for the system of FIG. 1 that employs a processing system for delivery of different services through different client devices, in accordance with an exemplary embodiment of the disclosure.

FIG. 8 is a conceptual diagram that illustrates an example of a hardware implementation for the system of FIG. 1 that employs a processing system for delivery of over-the-top (OTT) services through media content streaming devices, in accordance with an exemplary embodiment of the disclosure. In FIG. 8, the hardware implementation is shown by a representation 800 for the trigger management system 122 that employs a processing system 802 for management and delivery of services on a distribution network, in response to one or more event triggers, in accordance with an exemplary embodiment of the disclosure, as described herein. In some examples, the processing system 802 may comprise one or more hardware processors 804, a non-transitory computer readable medium 806, the integration manager 204, the content recognizer 206, the event opportunity store 208, the trigger scheduler 210, the fingerprinting system 130, and the watermarking system 132.

In this example, the trigger management system 122 that employs the processing system 802 may be implemented with bus architecture, represented generally by a bus 808. The bus 808 may include any number of interconnecting buses and bridges depending on the specific implementation of the trigger management system 122 and the overall design constraints. The bus 808 links together various circuits including the one or more processors, represented generally by the hardware processor 804, the non-transitory computer-readable media, represented generally by the non-transitory computer readable medium 806, the integration manager 204, the content recognizer 206, the event opportunity store 208, the trigger scheduler 210, the fingerprinting system 130, and the watermarking system 132 which may be configured to carry out one or more operations or methods described herein. A bus interface 810 renders an interface between the bus 808 and a transceiver 812. The transceiver 812 facilitates communication via the communication network 154 (FIG. 1) with various other apparatus, such as the video service provider 110, the client device 138, and the secondary device 140.

The hardware processor 804 may be configured to manage the bus 808 and general processing, including the execution of a set of instructions stored on the non-transitory computer readable medium 806. The set of instructions, when executed by the hardware processor 804, causes the trigger management system 122 to execute the various functions described herein for any particular apparatus. The non-transitory computer readable medium 806 may also be used for storing data that is manipulated by the hardware processor 804 when executing the set of instructions. The non-transitory computer readable medium 806 may also be configured to store data for one or more of the integration manager 204, the content recognizer 206, the event opportunity store 208, the trigger scheduler 210, the fingerprinting system 130, and the watermarking system 132.

In an aspect of the disclosure, the hardware processor 804, the non-transitory computer readable medium 806, or a combination of both may be configured or otherwise specially programmed to execute the operations or functionality of the integration manager 204, the content recognizer 206, the event opportunity store 208, the trigger scheduler 210, the fingerprinting system 130, and the watermarking system 132, or various other components described herein. For example, the hardware processor 804, the non-transitory computer readable medium 806, or a combination of both may be configured or otherwise specially programmed to perform the operations and functionality of the integration manager 204, the content recognizer 206, the event opportunity store 208, the trigger scheduler 210, the fingerprinting system 130, and the watermarking system 132 as described with respect to FIGS. 1, 2, 3A, 3B, 4, 5, 6, and 7A to 7E.

The "OTT services" are services that allows at least one of the video services provider 110, the interactive service provider 120, or the interactive service provider partners 148 to provide audio, video, and other media services (for example, purchase, payment, social sharing, or reverse bidding on products advertised in advertisements) to a consumer over the internet via streaming media, bypassing telecommunications, cable or broadcast television service providers that traditionally act as a controller or distributor of such content. Further, an entity that delivers the OTT service may not own a distribution network through which the OTT service is delivered. In some cases, an entity that delivers the OTT service may partially or completely own a distribution network through which the OTT service is delivered. For example, an entity that delivers the OTT service may deliver the OTT service through a network owned by a different service provider.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing first one or more lines of code and may comprise a second "circuit" when executing second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g. and for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

The terminology used herein is for the purpose of describing particular embodiments only and is not intended to be limiting of embodiments of the present disclosure. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any non-transitory form of computer readable storage medium having stored therein a corresponding set of computer instructions that upon execution would cause an associated processor to perform the functionality described herein. Thus, the various aspects of the present disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the present disclosure may provide a non-transitory machine and/or computer readable storage and/or media, having stored thereon, a machine code and/or a computer program having at least one code section executable by a machine and/or a computer, thereby causing the machine and/or computer to perform the steps as described herein to obtain a global workflow sequence.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithm, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the present disclosure has been described with reference to certain embodiments, it will be noted understood by, for example, those skilled in the art that various changes and modification could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the present disclosure described herein need not be performed in any particular order. Furthermore, although elements of the present disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system, comprising:
   a memory for storing instructions; and
   a first processor in an interactive service provider for delivery of at least one service through at least one of a client device or a secondary device paired with the client device, wherein the first processor is configured to execute the instructions to:
   insert at least one of a plurality of digital watermarks, a plurality of digital fingerprints, or a plurality of trigger identifiers at a plurality of event opportunities in media content,
      wherein the media content is associated with a video service provider different from the interactive service provider,
      wherein the insertion is executed by the interactive service provider via a first integration with the video service provider,
      wherein the media content comprises programming media content and non-programming media content,
      wherein the plurality of event opportunities corresponds to a plurality of candidate time intervals in a playback duration of the media content, and
      wherein the client device comprises a second processor configured to:
         detect the at least one of the inserted plurality of digital watermarks, the inserted plurality of digital fingerprints, or the inserted plurality of trigger identifiers in the media content, in the playback duration of the media content at the client device,
            wherein the detection is instructed by the interactive service provider via a second integration with the client device;
         identify, in a registry, information indicating next action of the client device based on the at least one of the inserted plurality of digital watermarks, the inserted plurality of digital fingerprints, or the inserted plurality of trigger identifiers in the media content and instruction calls raised by a trigger client software development kit on behalf of the client device;
         render a plurality of overlay graphics on the media content for the plurality of candidate time intervals based on the identified information;
         activate, via the second integration, at least one rendered overlay graphic of the rendered plurality of overlay graphics and one or more input devices in vicinity of the client device,
            wherein the at least one rendered overlay graphic and the one or more input devices are activated based on previous service requests for the plurality of event opportunities on which the at least one service was rendered as a user-selectable option on the secondary device based on usage statistics of the secondary device and engagement with the at least one rendered overlay graphic on the activation of the at least one rendered overlay graphic;
         receive, via the activated one or more input devices, one or more trigger responses over the at least one activated overlay graphic in the playback duration; and
         display an interactive view on the client device based on the received one or more trigger responses,
            wherein the interactive view displays a message and a transfer of a first view associated with a selection on the user-selectable option to a second view associated with the delivery of the at least one service along with a playback of the media content in the playback duration, and
            wherein the message indicates the delivery of the at least one service.

2. The system according to claim 1, wherein the first processor is further configured to receive, from the video service provider, the media content that comprises the programming media content and the non-programming media content.

3. The system according to claim 2, wherein the first processor is further configured to receive a request, from the video service provider, for analysis of the media content,
   wherein the analysis comprises at least one digital fingerprinting and digital watermarking of the media content.

4. The system according to claim 1, wherein the first processor is further configured to:
   fingerprint programming media content and the non-programming media content; and
   generate fingerprint information for the programming media content and the non-programming media content, wherein the fingerprint information comprises at least one of acoustic fingerprint information and video fingerprint information for different segments of the programming media content and the non-programming media content,
      wherein the different segments comprises audio frames or image frames of the non-programming media content.

5. The system according to claim 1, wherein the plurality of digital watermarks are inserted into an audio portion or a video portion of the media content at the plurality of event opportunities in the media content.

6. The system according to claim 5, wherein the first processor is further configured to generate watermark information that comprises metadata for at least one of an acoustic watermark or a video watermark inserted between different segments of the media content.

7. The system according to claim 1, wherein each event opportunity corresponds to a specified event in the media content, and
wherein the specified event corresponds to at least one of start credits, end credits, lull points, time-based marked regions, location-based marked regions, context-based marked regions, explicit scene start and end, and product placement opportunities, within the media content.

8. The system according to claim 1, wherein each trigger identifier of the plurality of trigger identifiers is at least one of Society of Cable and Telecom Engineers (SCTE) 35 triggers, playlists, manifest tags, SCTE-104 triggers, Nielsen ID3 tags, inaudible beacons, image beacons, and data beacons.

9. The system according to claim 1, wherein the second processor in the client device is further configured to pair up at least one of the one or more input devices available in vicinity of the client device or the secondary device,
wherein the at least one of the one or more input devices are paired via at least one of a Bluetooth network, a Wi-Fi network, an internet-based network, a wired local network, and a wireless ad hoc network.

10. The system according to claim 1, wherein a virtual voice assistant is enabled on at least one of the one or more input devices or on at least one of the client device or the secondary device.

11. The system according to claim 10, wherein the at least one of the one or more input devices enabled with the virtual voice assistant is configured to actively wait and listen for a trigger identifier in an audio portion of the media content.

12. The system according to claim 11, the second processor in the client device is further configured to:
instruct the virtual voice assistant to detect at least one beacon within the playback duration of the media content; and
facilitate a conversation with a user associated with the client device, to receive a trigger response from the user, wherein the trigger response is received through a user's speech input.

13. The system according to claim 1, wherein the non-programming media content comprises promotional media content for at least one of a product offering or a service offering, and
wherein the promotional media content comprises at least one of graphical content, textual content, video content, or animated content.

14. The system according to claim 1, wherein the at least one service comprises at least one of a direct payment, a direct transaction, or a direct notification for selected at least one product offering or at least one service offering, and a direct update of the selected at least one product offering or the at least one service offering on a shopping cart, a personalized list, or a social platform.

15. The system according to claim 1, wherein the second processor in the client device is further configured to execute a check to decide whether to activate the one or more input devices from a set of input devices or the rendered plurality of overlay graphics.

16. The system according to claim 15, wherein the decision is based on the check executed on a defined criteria that is associated with records of previous service requests for the plurality of event opportunities on which the at least one service was delivered in past, and
wherein the defined criteria comprises at least one of a user-defined constraint, an inventory constraint, and a specified threshold count of trigger responses for a product offering or a service offering promoted by the non-programming media content.

17. The system according to claim 1, the first processor is further configured to deliver at least one notification on at least one of the client device or the secondary device paired with the client device, in response to the received one or more trigger responses.

18. The system according to claim 1, wherein the one or more trigger responses correspond to one or more user interactions that are received based on at least one of a touch input, a gesture input, a haptic feedback input and a voice command input.

19. A method, comprising:
in a system that comprises an interactive service provider that handles delivery of a service through a client device or a secondary device paired with the client device:
inserting, by a first processor of the interactive service provider, at least one of a plurality of digital watermarks, a plurality of digital fingerprints, or a plurality of trigger identifiers at a plurality of event opportunities in media content prepared by a video service provider different from the interactive service provider,
wherein the insertion is executed by the interactive service provider via a first integration with the video service provider,
wherein the media content comprises programming media content and non-programming media content, and
wherein the plurality of event opportunities corresponds to a plurality of candidate time intervals in a playback duration of the media content,
detecting, by a second processor in the client device, at least one of the inserted plurality of digital watermarks, the plurality of digital fingerprints, or the inserted plurality of trigger identifiers in the media content, in the playback duration of the media content at the client device,
wherein the detection is instructed by the interactive service provider via a second integration with the client device;
identifying, by the second processor in the client device, in a registry, information indicating next action of the client device in a registry based on the at least one of the inserted plurality of digital watermarks, the inserted plurality of digital fingerprints, or the inserted plurality of trigger identifiers in the media content and instruction calls raised by a trigger client software development kit on behalf of the client device;
rendering, by the second processor in the client device, a plurality of overlay graphics on the media content for the plurality of candidate time intervals in the media content;
activating, by the second processor in the client device, via the second integration, at least one of one or more input devices paired with the client device and at least one rendered overlay graphic of the plurality of overlay graphics rendered on the media content,
wherein the at least one rendered overlay graphic and the at least one of the one or more input devices are activated based on previous service requests for the plurality of event opportunities on which the at least one service was rendered as a user-selectable option on the secondary device based on usage statistics of the secondary device and engagement with the at least one rendered overlay graphic on the activation of the at least one rendered overlay graphic;

receiving, by the second processor in the client device, one or more trigger responses over the at least one activated overlay graphic rendered on the media content in the playback duration, via the activated one or more input devices; and displaying, by the second processor in the client device, an interactive view on the client device, to enable delivery of at least one service in response to the received one or more trigger responses, wherein the interactive view displays a message and a transfer of a first view associated with a selection on the user-selectable option to a second view associated with the delivery of the at least one service along with a playback of the media content in the playback duration.

20. The method according to claim 19, wherein each event opportunity corresponds to a specified event in the media content, and wherein the specified event corresponds to at least one of start credits, end credits, lull points, time-based marked regions, location-based marked regions, context-based marked regions, explicit scene start and end, and product placement opportunities, within the media content.

* * * * *

UNITED STATES PATENT AND TRADEMARK OFFICE
CERTIFICATE OF CORRECTION

PATENT NO. : 11,778,272 B2
APPLICATION NO. : 17/453628
DATED : October 3, 2023
INVENTOR(S) : Donald Jude Loheide et al.

It is certified that error appears in the above-identified patent and that said Letters Patent is hereby corrected as shown below:

In the Claims

In Column 38, Line 45, Claim 19, delete "device, in a registry," and insert -- device, --, therefor.

Signed and Sealed this
Ninth Day of January, 2024

Katherine Kelly Vidal
*Director of the United States Patent and Trademark Office*